(12) United States Patent
Kawano et al.

(10) Patent No.: US 7,499,241 B2
(45) Date of Patent: Mar. 3, 2009

(54) MEDIA CARTRIDGE AUTOLOADER

(75) Inventors: Masakazu Kawano, Tama (JP); Tomoaki Sakaguchi, Tama (JP); David Ray Berry, Colorado Springs, CO (US)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 360 days.

(21) Appl. No.: 11/280,872

(22) Filed: Nov. 16, 2005

(65) Prior Publication Data

US 2006/0291091 A1 Dec. 28, 2006

(30) Foreign Application Priority Data

Jun. 24, 2005 (JP) ............................. 2005-185492
Sep. 12, 2005 (JP) ............................. 2005-264078

(51) Int. Cl.
*G11B 15/68* (2006.01)

(52) U.S. Cl. ....................................................... 360/92

(58) Field of Classification Search ........................ None
See application file for complete search history.

(56) References Cited

U.S. PATENT DOCUMENTS 6,606,218 B2 * 8/2003 Collins et al. ............... 360/92.1
6,816,331 B2 * 11/2004 Porter et al. ................... 360/69

FOREIGN PATENT DOCUMENTS

JP           2003 45102          2/2003

* cited by examiner

*Primary Examiner*—Mark Blouin
(74) *Attorney, Agent, or Firm*—Ladas & Parry LLP

(57) ABSTRACT

A media cartridge autoloader is disclosed. A rotary arm that operates a cartridge transporter is rotated in one direction to reach a reference position. With reference to the reference position, the rotary arm is rotated through a predetermined angle in the opposite direction to reach a position, which is defined as a home position. The rotary arm includes a flag array, and a non-flag section at an end of the flag array. A photo sensor detects the arrival of the rotary arm at the reference position in response to a detection of the non-flag section.

17 Claims, 26 Drawing Sheets

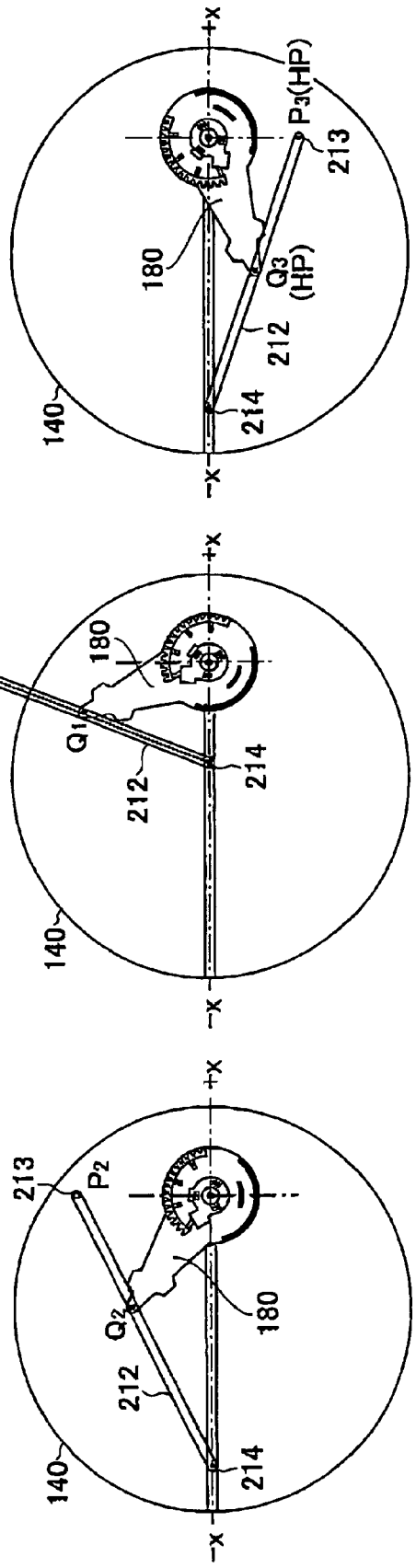

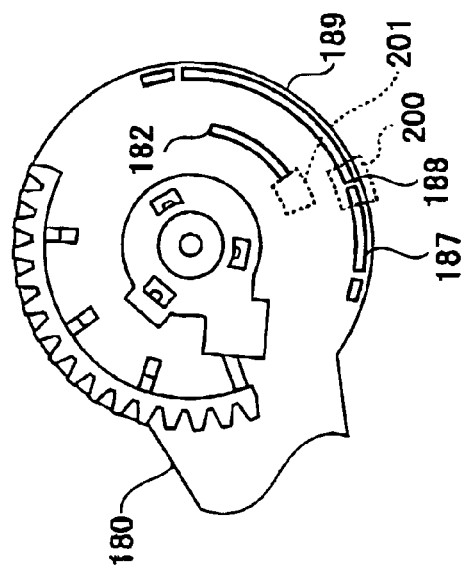
FIG.11B3
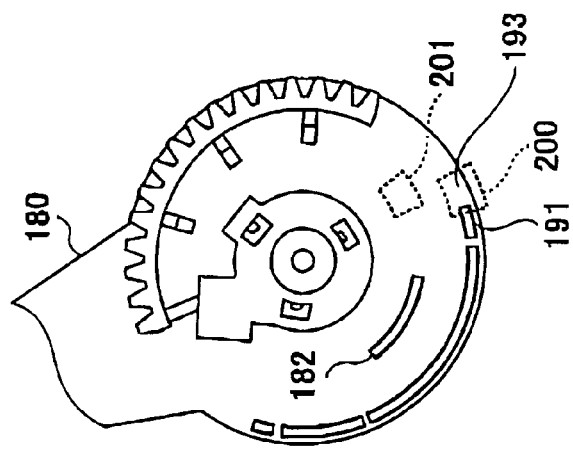
FIG.11B2
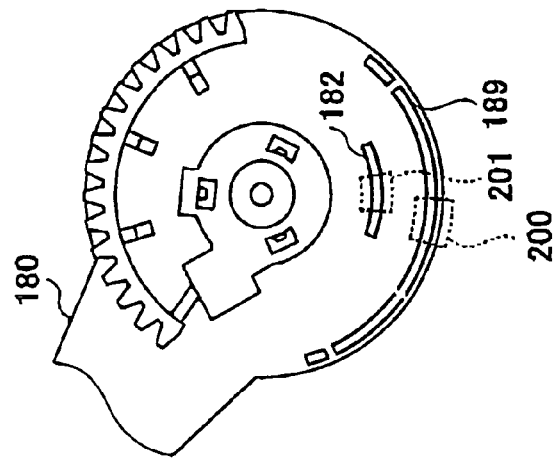
FIG.11B1

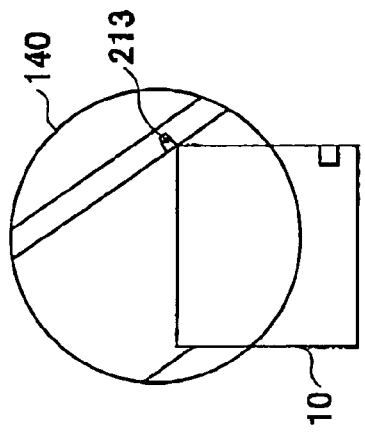
FIG.15A
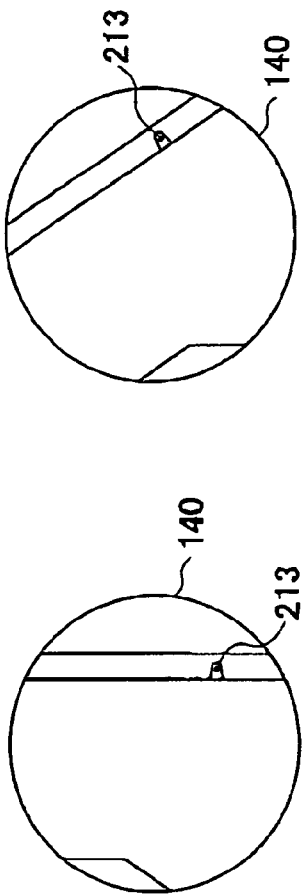
FIG.15B
FIG.15C
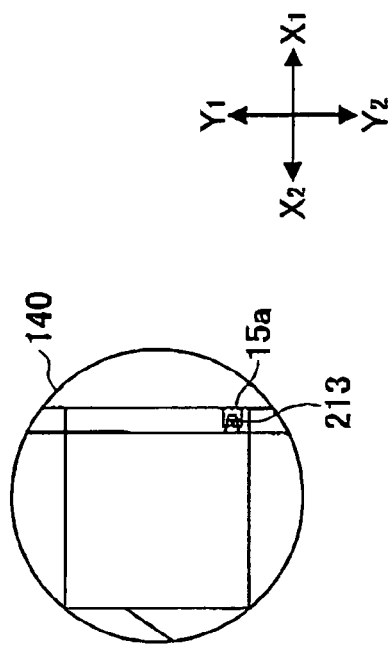
FIG.15D
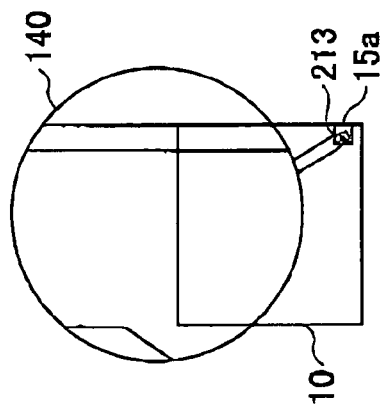
FIG.15E
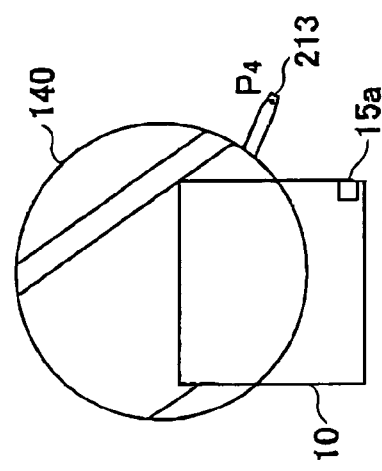
FIG.15F

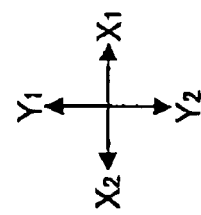
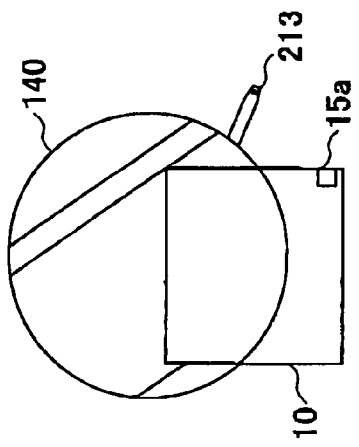
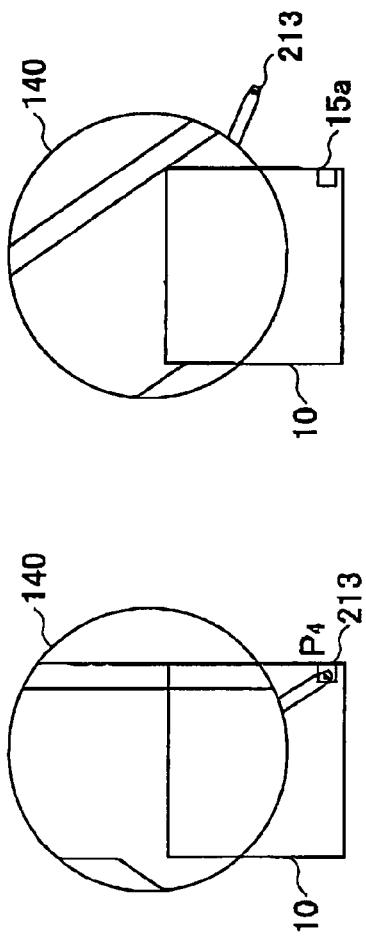
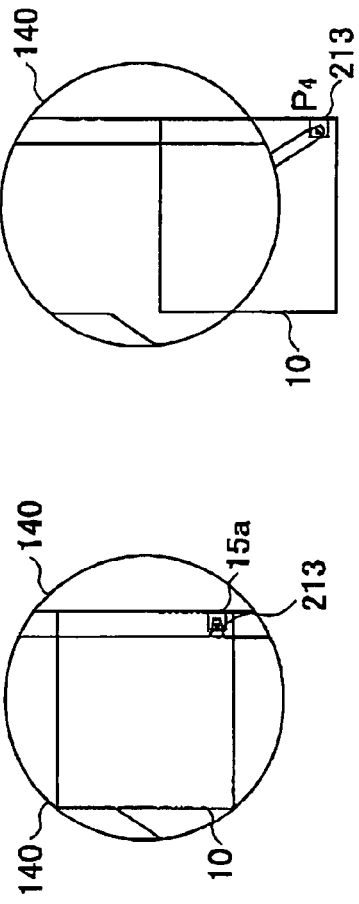
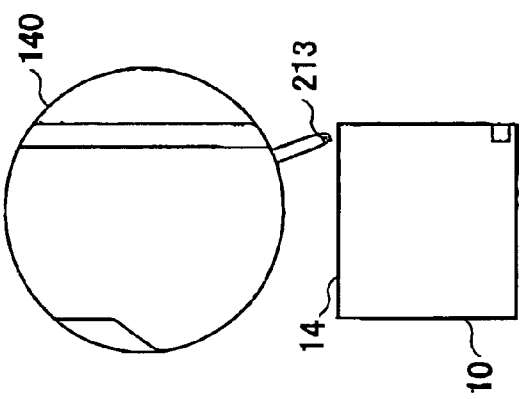
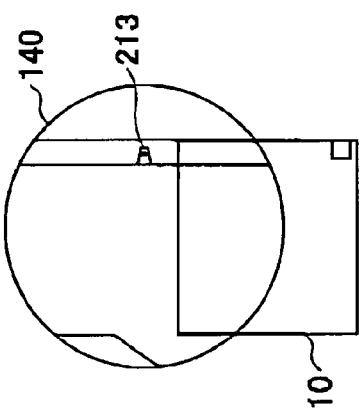
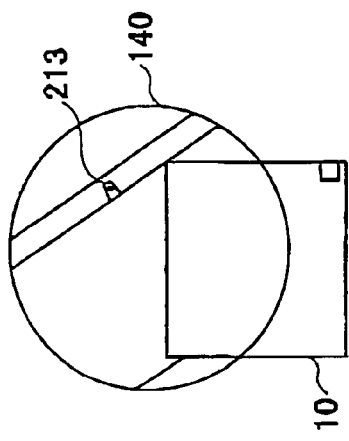

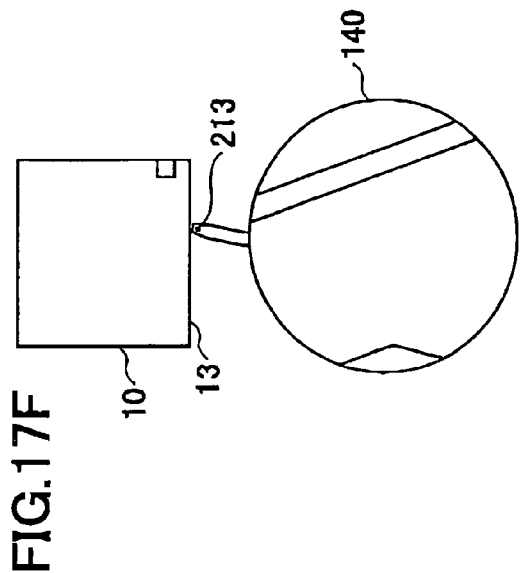
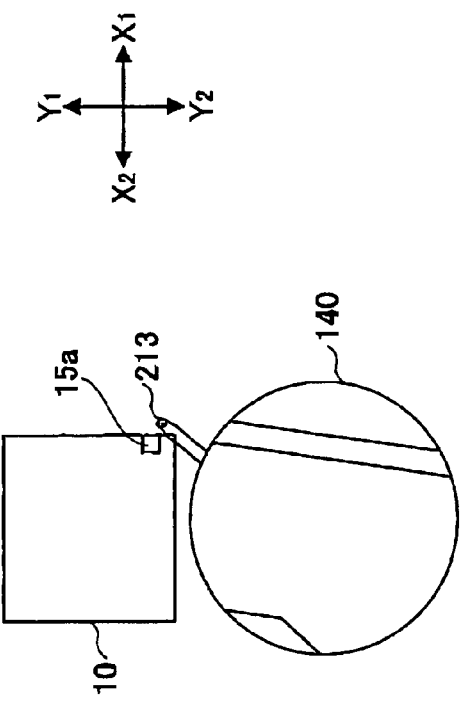
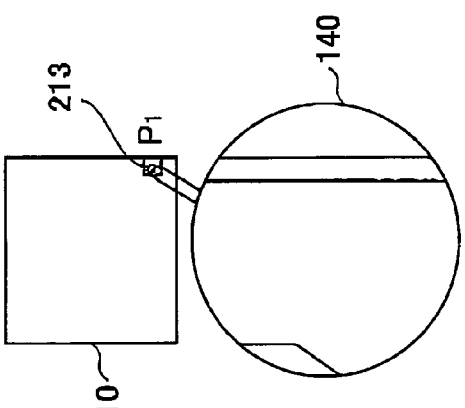
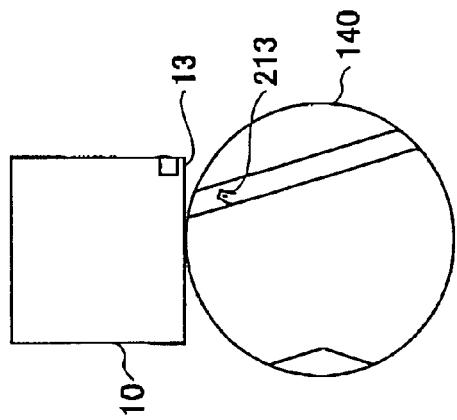
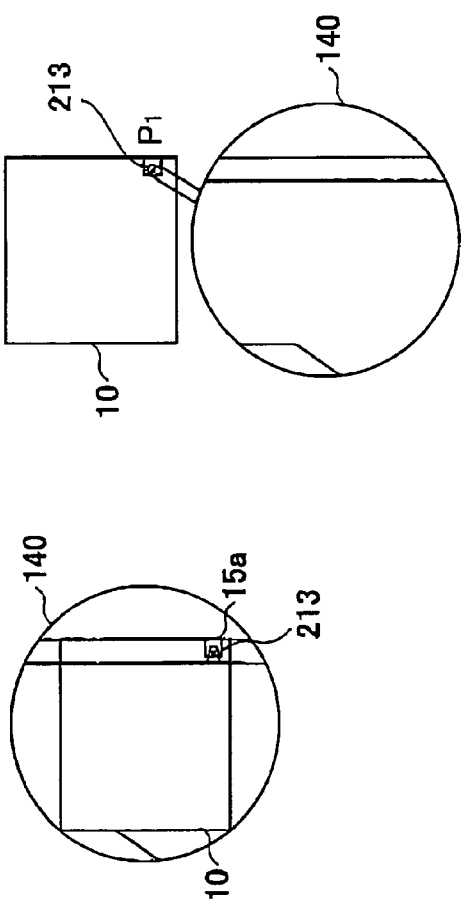
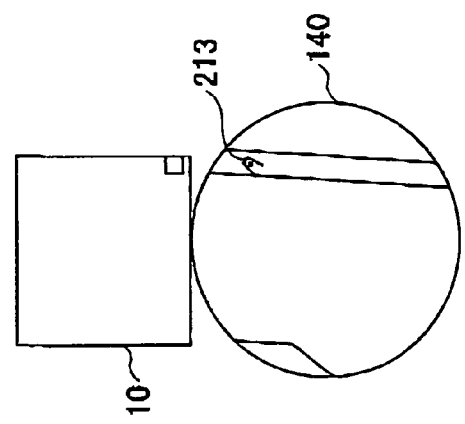

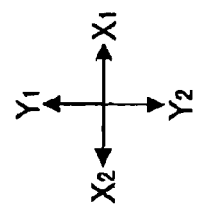
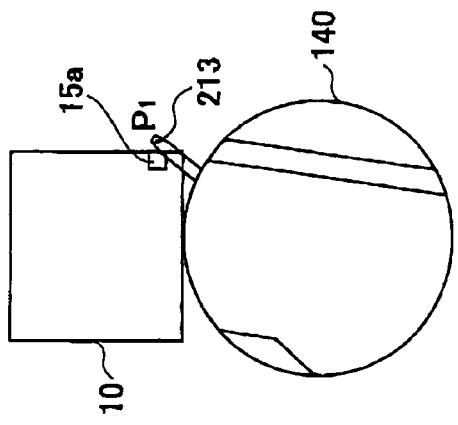
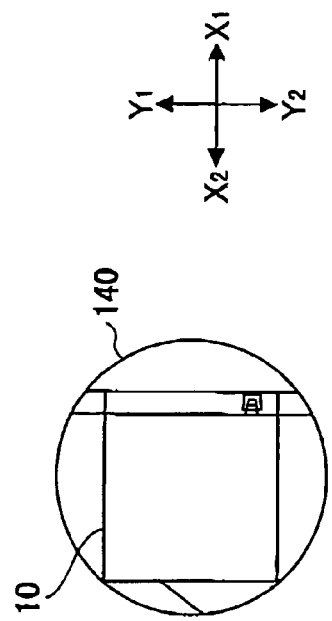
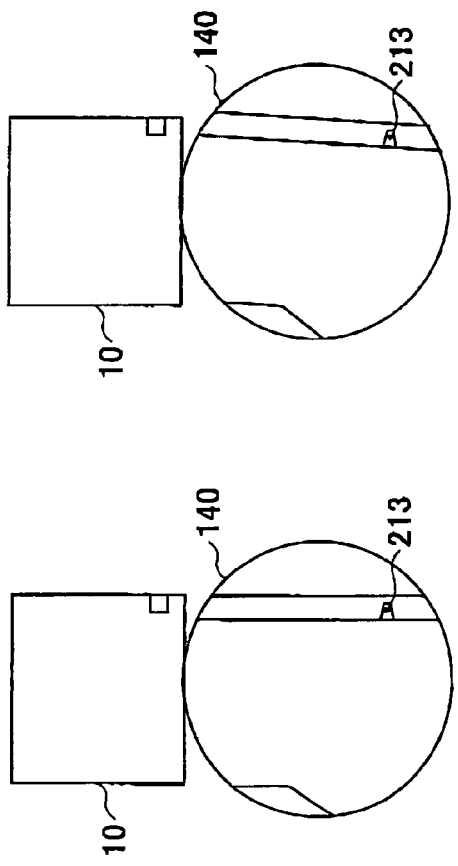
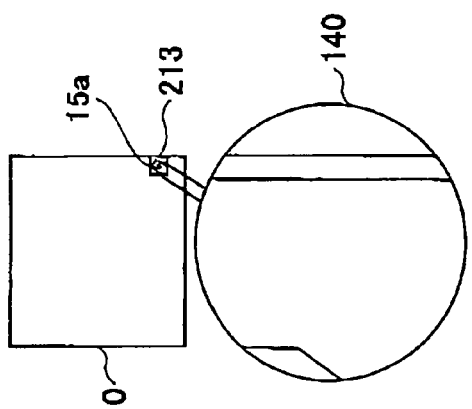

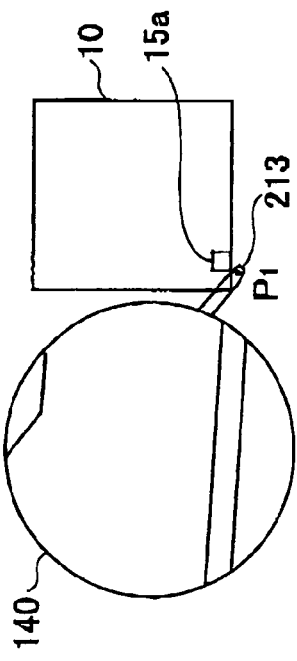
FIG.19A
FIG.19B
FIG.19C
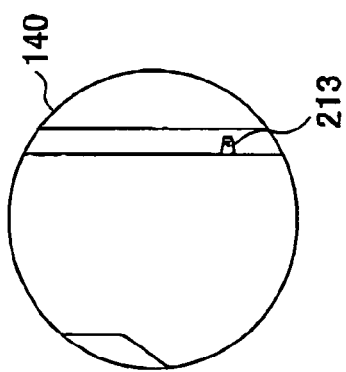
FIG.19D
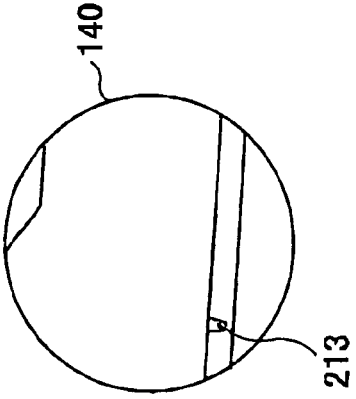
FIG.19E
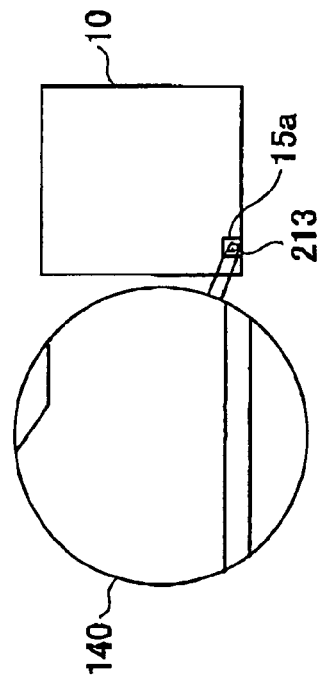
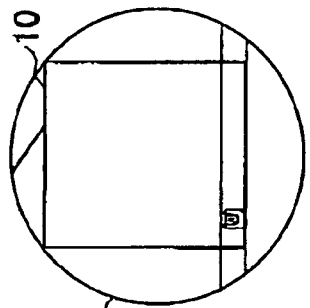

MEDIA CARTRIDGE AUTOLOADER

BACKGROUND OF THE INVENTION

1. Field of the Invention

The present invention relates to a media cartridge autoloader, and particularly relates to a media cartridge picker that moves a media cartridge in a media cartridge autoloader serving as a data storage unit.

2. Description of the Related Art

A typical media cartridge autoloader includes a media cartridge picker, a mail slot, at least one read/write media drive, and one or more media cartridge transport magazines. The media cartridge picker is configured to retrieve a media cartridge and transport it among the mail slot, the media drive, and the media cartridge transport magazine(s).

The media cartridge picker includes a base, a turntable configured to rotate on the base so as to change the orientation of the media cartridge, and a media cartridge transport mechanism provided on the turntable and configured to retrieve and transport the media cartridge. The media cartridge transport mechanism includes a rotary arm configured to rotate bi-directionally, a perpendicular cartridge pin configured to engage a notch formed in the media cartridge, and a mechanism configured to move the cartridge pin linearly and bi-directionally by the rotation of the rotary arm. In another embodiment, the cartridge pin can be moved non-linearly.

The cartridge pin and the rotary arm have predetermined home positions HP on the turntable, respectively. The home positions are where the cartridge picker and the rotary arm are located when the cartridge picker is in a reference state for starting operations.

When the media cartridge autoloader is turned on, the media cartridge transport mechanism of the media cartridge picker moves the rotary arm and the cartridge pin located arbitrarily to the corresponding home positions HP. Then, the media cartridge autoloader starts operations according to a command. The operation of moving the rotary arm and the cartridge pin to the home positions are referred to herein as a media cartridge transport mechanism initialization operation.

In the media cartridge transport mechanism initialization operation, the rotary arm is rotated in a predetermined direction until it comes into contact with a stopper. Then, from this position, which is defined as a reference position, the rotary arm is rotated through a predetermined angle in the opposite direction to stop at the home position HP.

However, because the rotary arm hits against the stopper every time the media cartridge autoloader is turned on, the rotary arm can have a limited durability.

SUMMARY OF THE INVENTION

The present invention provides a media cartridge autoloader that comprises: a media cartridge picker including a turntable capable of supporting a media cartridge and rotating to change the orientation of the media cartridge supported thereby; a turntable rotating mechanism configured to rotate the turntable; and a media cartridge transport mechanism provided on the turntable and configured to transport the media cartridge onto and off of the turntable; a mail slot through which the media cartridge is inserted or ejected; at least one read/write media drive into which the media cartridge is loaded; and at least one media cartridge storage section configured to store the media cartridge therein; wherein the mail slot, the read/write media drive, and the media cartridge storage section are arranged around the media cartridge picker; the media cartridge transport mechanism includes a rotary arm configured to rotate reciprocally; a drive mechanism configured to rotate the rotary arm; an arm position detector configured to detect a position of the rotated rotary arm; and a media cartridge pin configured to move between a position within the turntable and a position outside the turntable in conjunction with the rotation of the rotary arm so as to transport the media cartridge; the rotary arm has a reference position such that the media cartridge pin is located outside the turntable, and a home position such that the media cartridge pin is located within the turntable, and is configured to be positioned at the home position as a result of rotating in one direction to the reference position and then rotating in the opposite direction through a predetermined angle, the rotary arm including a special shape section that opposes the arm position detector when the rotary arm is rotated to the reference position and has a different shape from a normal section of the rotary arm; and the arm position detector detects an arrival of the rotary arm at the reference position in response to a detection of the special shape section.

According to the present invention, the arm position detector detects an arrival of the rotary arm at the reference position in response to a detection of the special shape section. With this configuration, the rotary arm can be positioned at the reference position without hitting against a stopper, thereby avoiding unnecessary impacts and loads on the rotary arm during the media cartridge transport mechanism initialization operation. Consequently, the durability of the media cartridge autoloader is improved.

BRIEF DESCRIPTION OF THE DRAWINGS

FIGS. 11A1-11A3 and 11B1-11B3 are schematic illustrations showing operations of the media cartridge linear transport mechanism;

FIGS. 15A-15F illustrate operations of the media cartridge picker for transporting a media cartridge, inserted from a mail slot, onto the turntable;

FIGS. 16A-16F illustrate operations of the media cartridge picker for ejecting the media cartridge, placed on the turntable, from the mail slot;

FIGS. 17A-17F illustrate operations of the media cartridge picker for loading the media cartridge, placed on the turntable, into a media drive;

FIGS. 18A-18E illustrate operations of the media cartridge picker for transporting the media cartridge, loaded in the media drive, onto the turntable;

FIGS. 19A-19E illustrate operations of the media cartridge picker and transporting the media cartridge, stored in a media cartridge transport magazine, onto the turntable;

DETAILED DESCRIPTION OF THE PREFERRED EMBODIMENT

Exemplary embodiments of the present invention are described hereinafter with reference to the accompanying drawings.

First Embodiment

A first embodiment is described in the following order.
1. Configuration and Operation Overview of Media Cartridge Autoloader
2. Configuration of Media Cartridge Picker 102
3. Initialization Operation of Cartridge Transporter 170
4. Operation of Microcomputer of Control Circuit 220
5. Initialization Operation of Media Cartridge Picker 102
6. Operation of Media Cartridge Picker 102
7. Additional Advantage of Flag Array 181

1 [Configuration and Operation Overview of Media Cartridge Autoloader 100]

Figure 1:
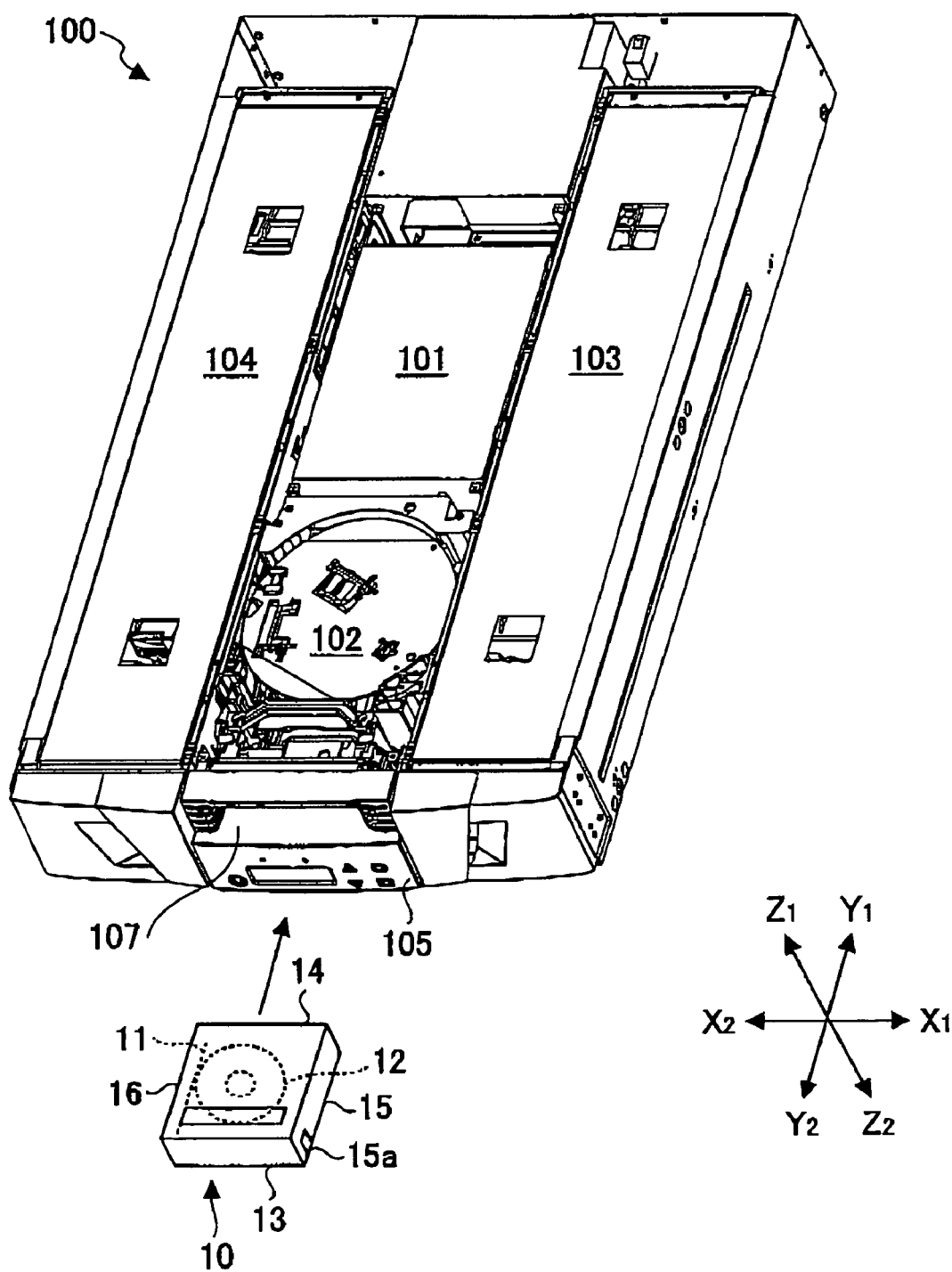
FIG. 1 is a perspective view illustrating a media cartridge autoloader with an upper cover thereof removed according to a first embodiment of the present invention.

FIG. 1 is a perspective view illustrating a media cartridge autoloader 100 with an upper cover thereof removed according to the first embodiment of the present invention. In the embodiments illustrated in the figures, the media cartridge autoloader is used with one or more tape cartridges, and is therefore referred to as a tape cartridge autoloader. It is recognized, however, that although the following description and the figures provided herein pertain particularly to an autoloader used for tape cartridges, any other suitable type of media cartridge can equally be used with the present invention, such as an optical disk cartridge, as one non-exclusive example. The embodiments disclosed herein are not intended to limit the scope of the present invention in any manner to use with tape cartridges or any other particular type of media. In other words, it is understood that the term "tape" as used herein can equally be substituted for the term "media".

Figure 2:
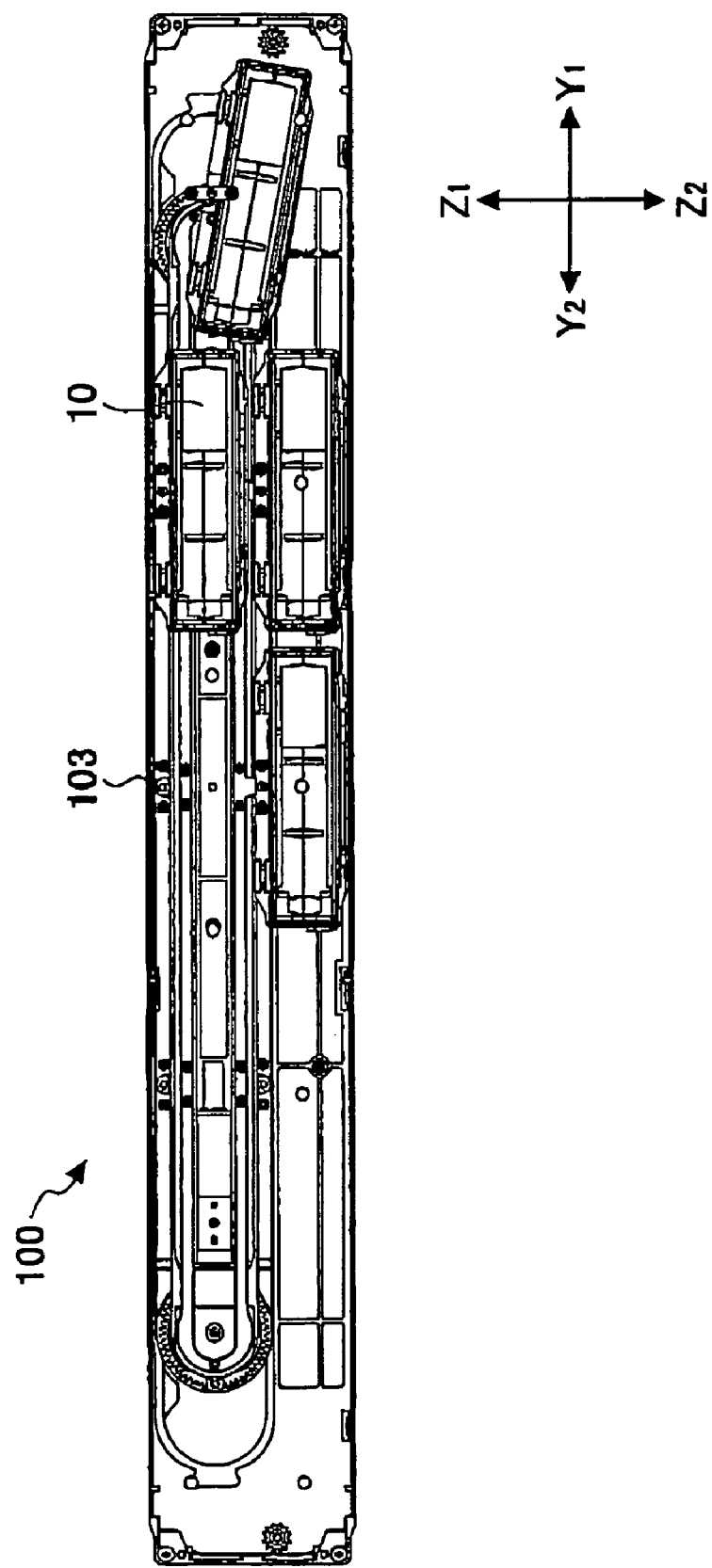
FIG. 2 is a side view illustrating the media cartridge autoloader of FIG. 1 with a side cover thereof removed.

FIG. 2 is a side view illustrating the tape cartridge autoloader 100 with a side cover thereof removed. Throughout the drawings, the width direction is indicated by a line X1-X2, the depth direction is indicated by a line Y1-Y2, and the height direction is indicated by a line Z1-Z2.

In one embodiment, the tape cartridge autoloader 100 generally includes a control panel 105, a mail slot 107, both on a front panel, a tape cartridge picker 102 at a position opposing the mail slot 107, tape cartridge transport magazines 103 and 104 located one on each of the X1 side and the X2 side, and a tape drive 101 on the Y1 side of the tape cartridge picker 102. Alternatively, the structures included in the autoloader 100 can be positioned and/or oriented in other suitable locations. A suitable tape cartridge 10 is applied to the tape cartridge autoloader 100. Non-exclusive examples of suitable tape cartridges include Digital Linear Tape (DLT) cartridges, Super Digital Linear Tape (SDLT) cartridges and Linear Tape Open (LTO) cartridges.

Referring to FIG. 1, the tape cartridge 10 includes a magnetic tape 11 wound on a single reel 12 therein such that the magnetic tape 11 is pulled out from a rear face of the tape cartridge 10, The tape cartridge 10 includes a front face 13, a rear face 14, side faces 15 and 16, and a notch 15a formed on the side face 15 which a cartridge pin (to be described below) engages.

Referring to FIG. 2, the tape cartridge transport magazines 103 and 104 are each configured to store plural tape cartridges 10 with the front faces 13 opposing the tape cartridge picker 102. The tape cartridge transport magazines 103 and 104 can also transport the tape cartridges 10 along a racetrack path elongated in the Y1-Y2 direction.

The tape drive 101 is operable to read and/or write data from or to the magnetic tape 11 pulled out from the loaded tape cartridge 10. The tape drive 101 includes a tape cartridge ejecting mechanism (not shown). Plural types of tape drives with different heights are available so that the one drive is selected from them and attached to the cartridge autoloader 100. For this operation, the tape cartridge picker 102 is provided with a turntable lifting mechanism 150 (to be described below).

Figure 3:
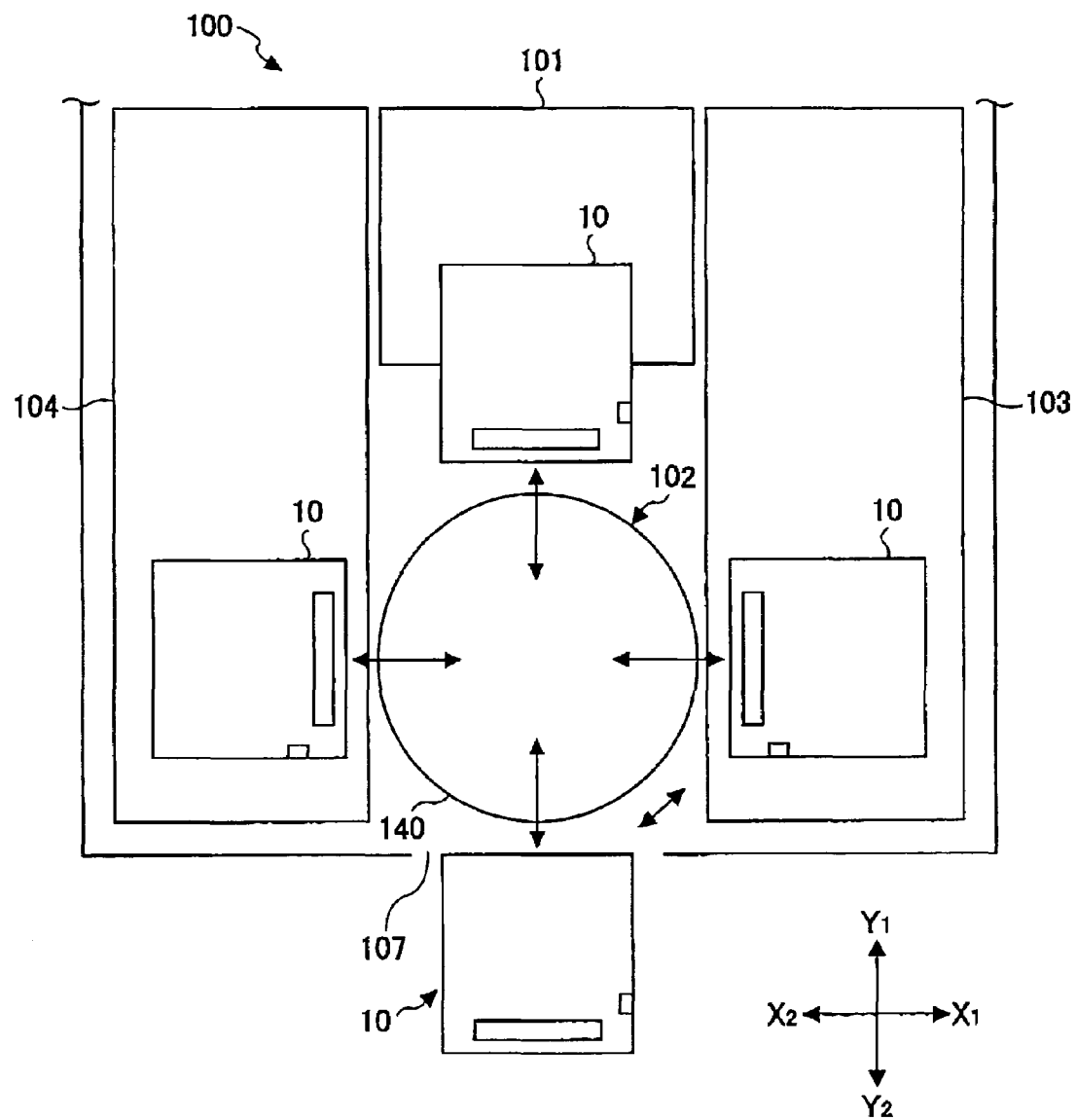
FIG. 3 is a schematic illustration showing operations of a media cartridge picker.

Referring to FIG. 3, the tape cartridge picker 102 is configured to transport the tape cartridge 10 onto or off of a turntable 140 for operations such as loading the tape cartridge 10 inserted through the mail slot 107 into the tape drive 101, retrieving the tape cartridge 10 from the tape cartridge transport magazines 103 and 104 to load the tape cartridge 10 into the tape drive 101, retrieving the tape cartridge from the tape drive 101 to return the tape cartridge 10 to one of the tape cartridge transport magazines 103 and 104, and ejecting the tape cartridge 10 through the mail slot 107. The tape cartridge picker 102 is also configured to rotate the turntable 140 by a predetermined rotational increment, such as every 90 degrees, although it is recognized that the predetermined rotational increment can be less than or greater than 90 degrees based on the design requirements of the autoloader 100. Further, the tape cartridge picker 102 can also lift/lower the turntable 140 as necessary. When the turntable 140 is rotated, the orientation of the tape cartridge 10 is changed.

2 [Configuration of Tape Cartridge Picker 102]

Figure 4:
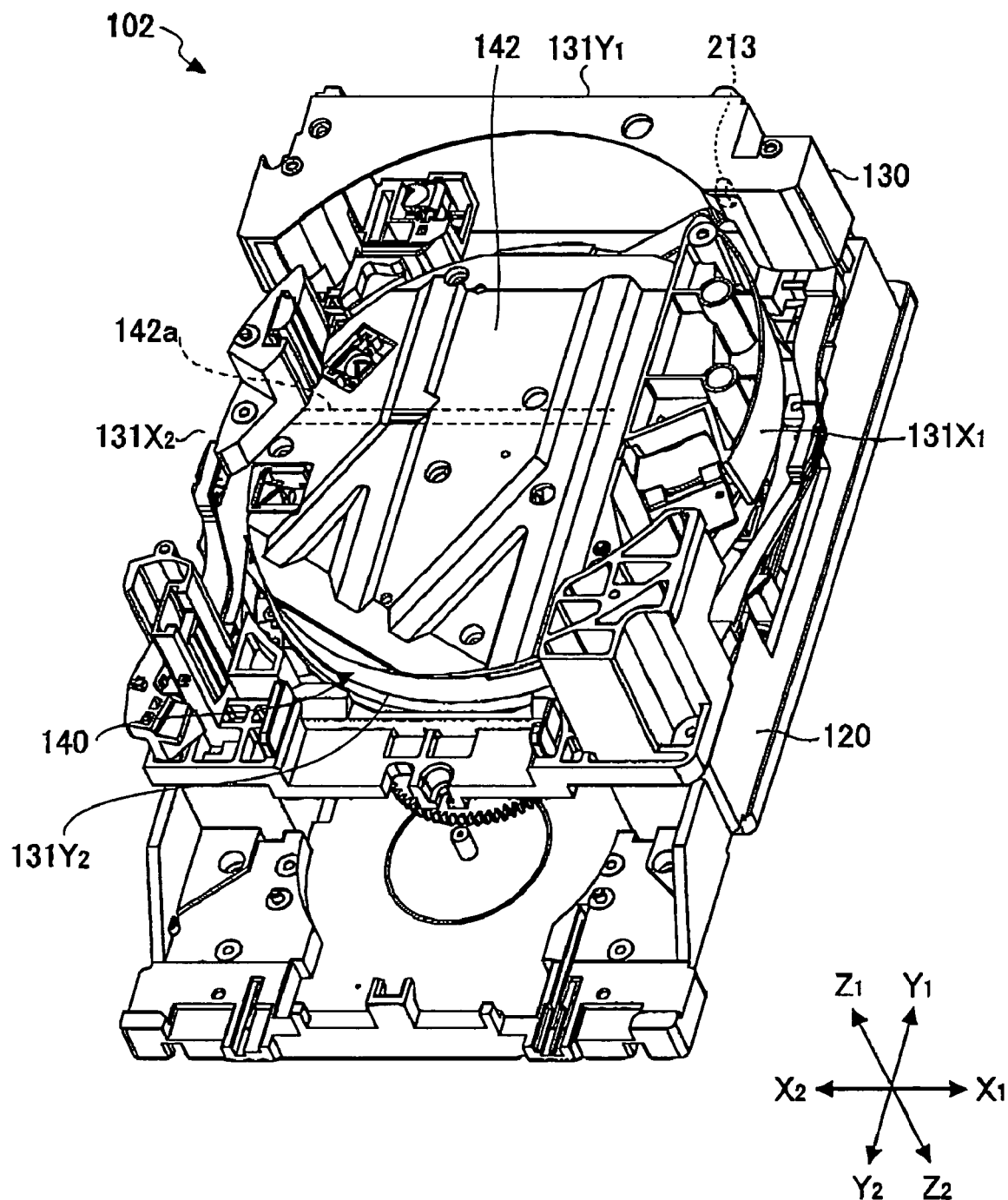
FIG. 4 is a perspective view illustrating the media cartridge picker.
Figure 5:
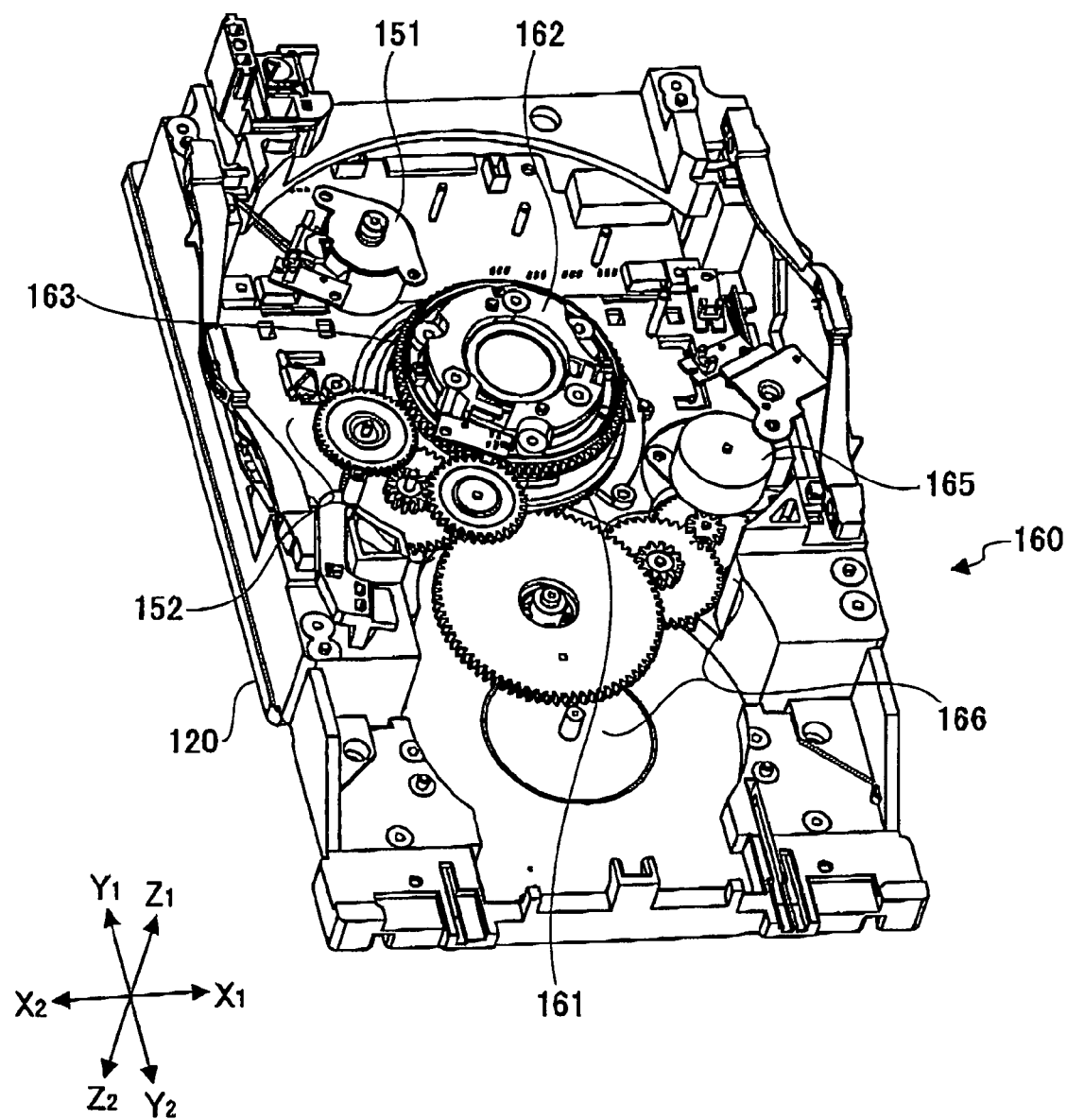
FIG. 5 is a perspective view illustrating the media cartridge picker with a pillar and a turntable removed.
Figure 6:
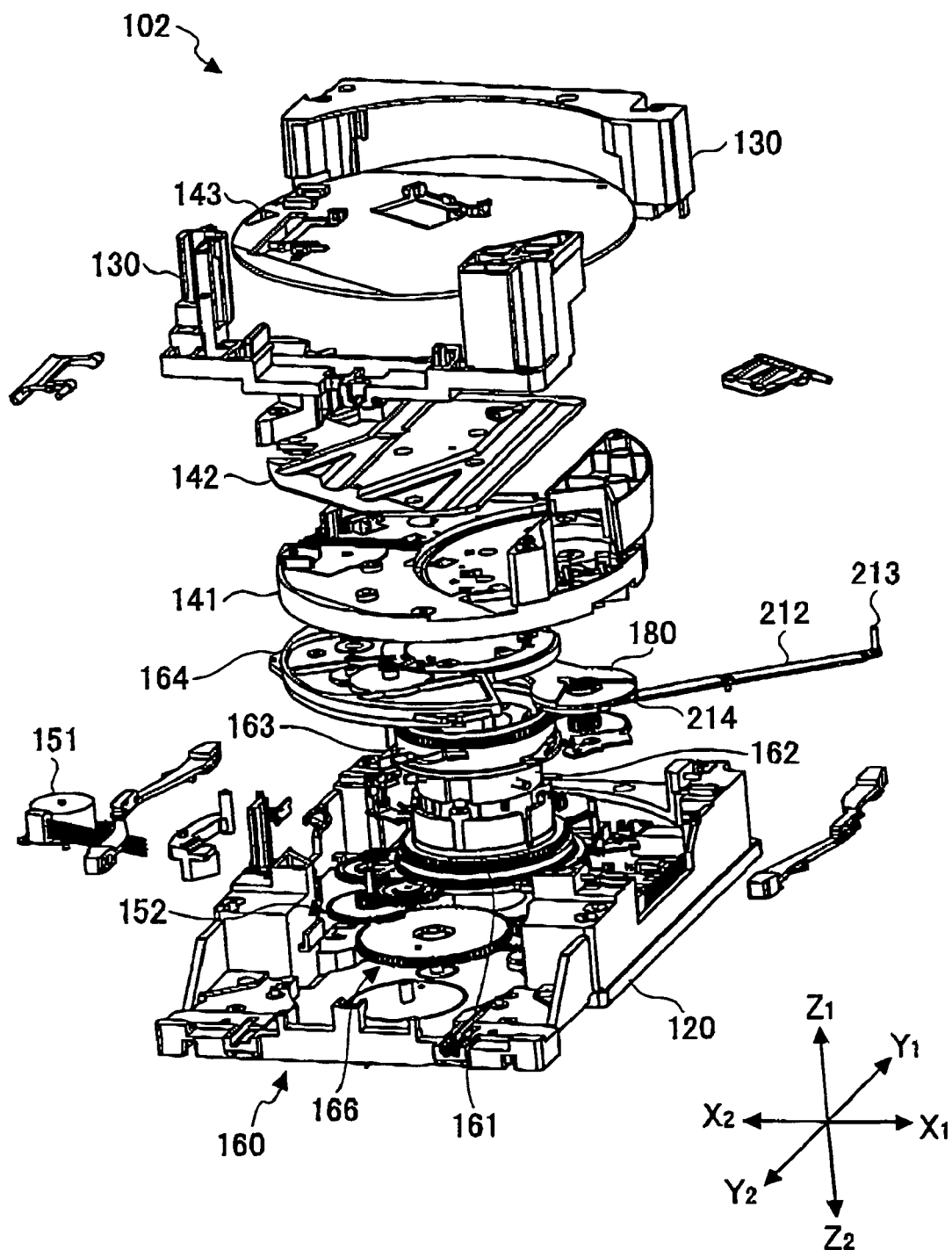
FIG. 6 is an exploded perspective view illustrating the media cartridge picker.
Figure 7:
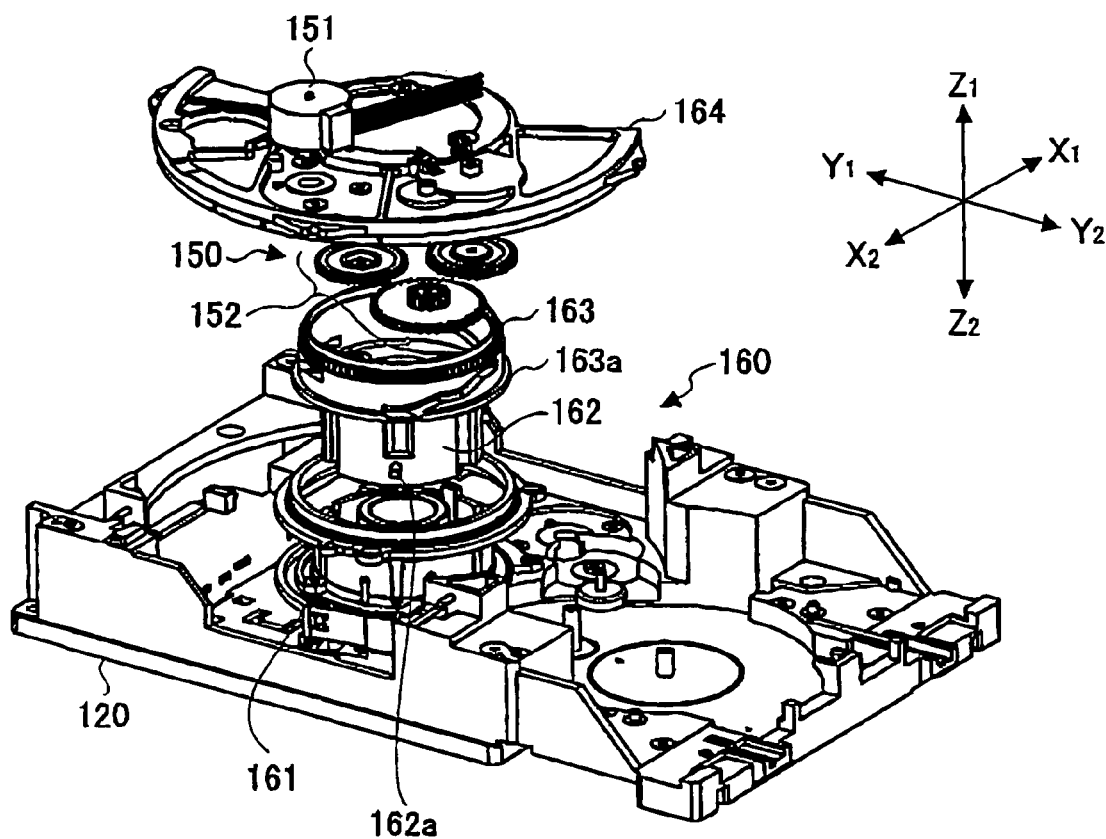
FIG. 7 is an exploded perspective view illustrating a turntable lifting mechanism of FIG. 6 in detail.

FIG. 4 illustrates the tape cartridge picker 102 with an upper plate 143 of the turntable 140 removed. FIG. 5 illustrates the tape cartridge picker 102 with a pillar 130 and the turntable 140 removed. FIG. 6 is an exploded perspective view illustrating the tape cartridge picker 102. FIG. 7 illustrates the turntable lifting mechanism 150 in detail.

Figure 22:
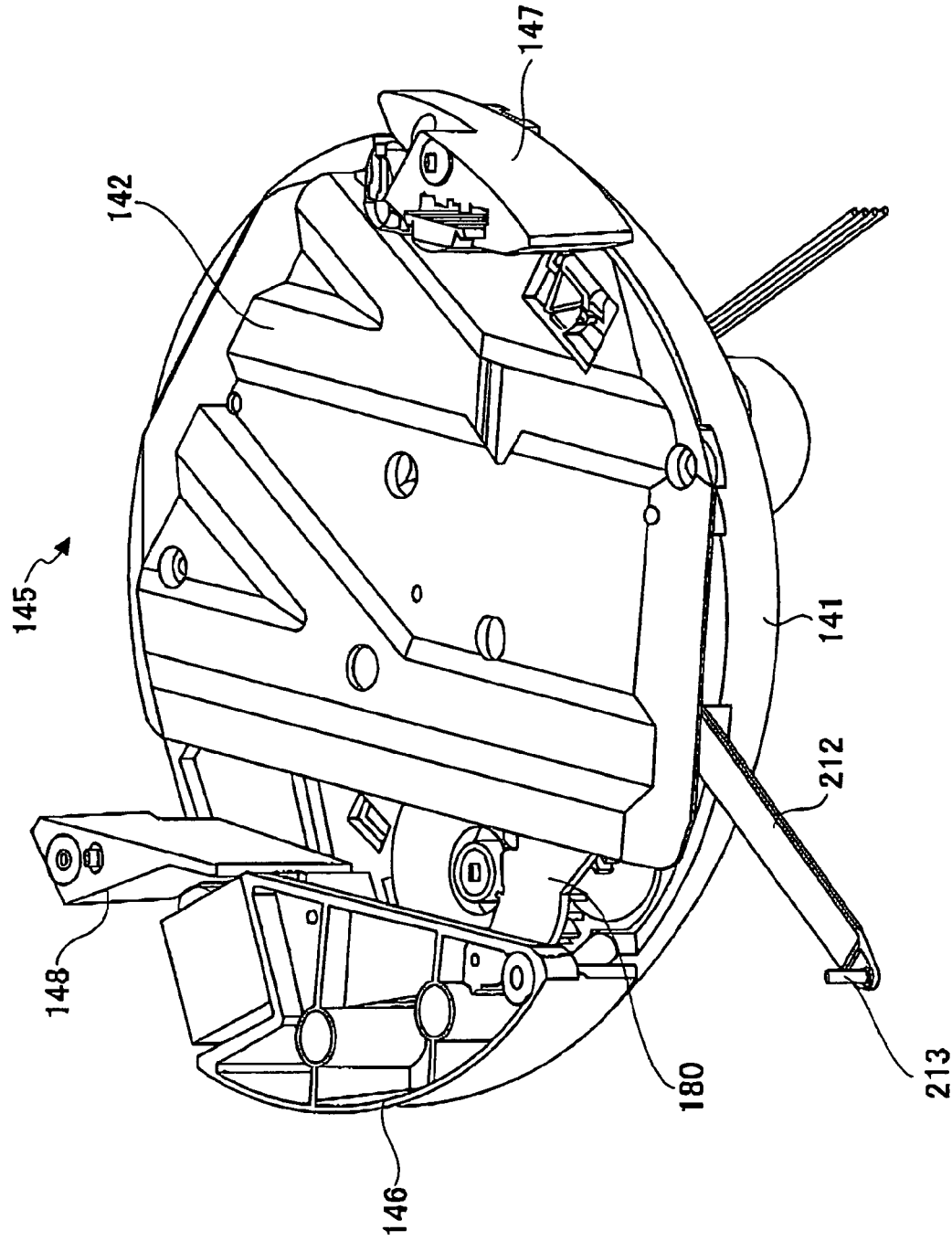
FIG. 22 illustrates a turntable sub-assembly with an upper plate removed.
Figure 23:
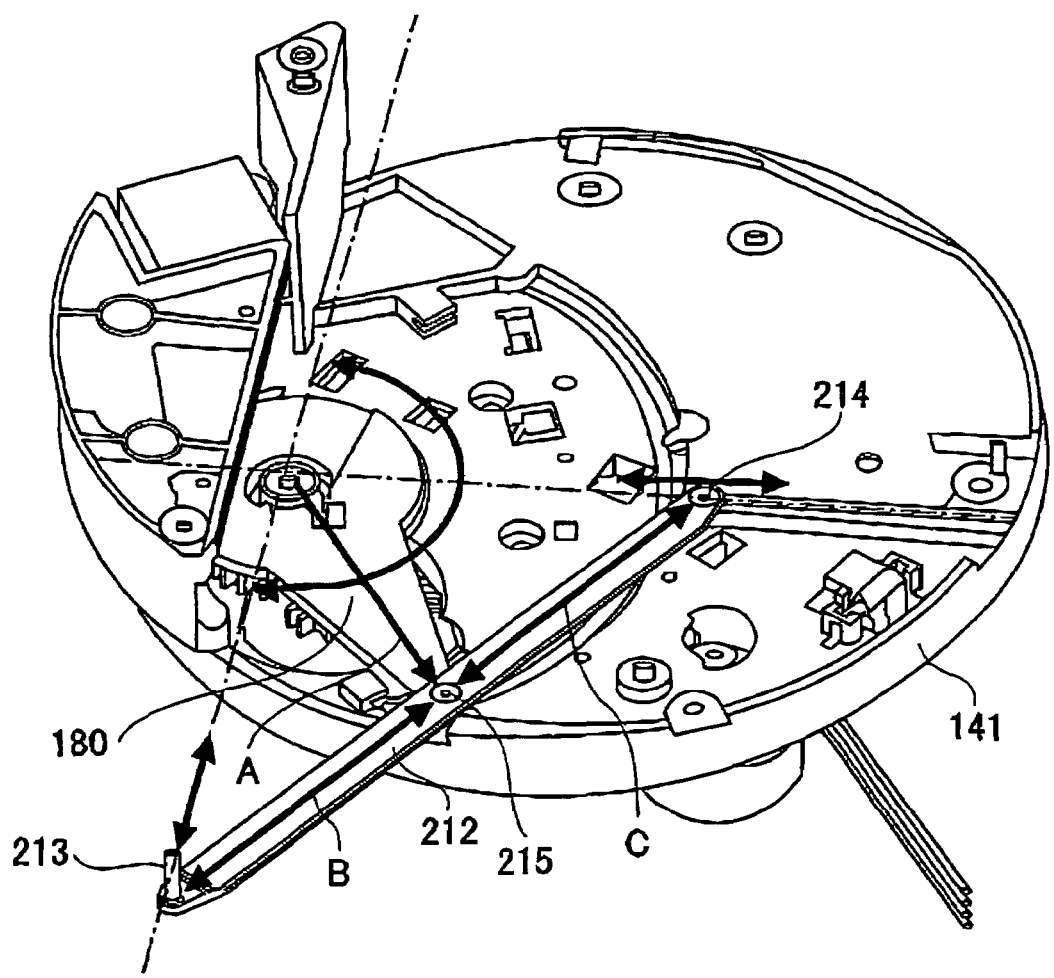
FIG. 23 illustrates the turntable sub-assembly with a floor plate removed.
Figure 24:
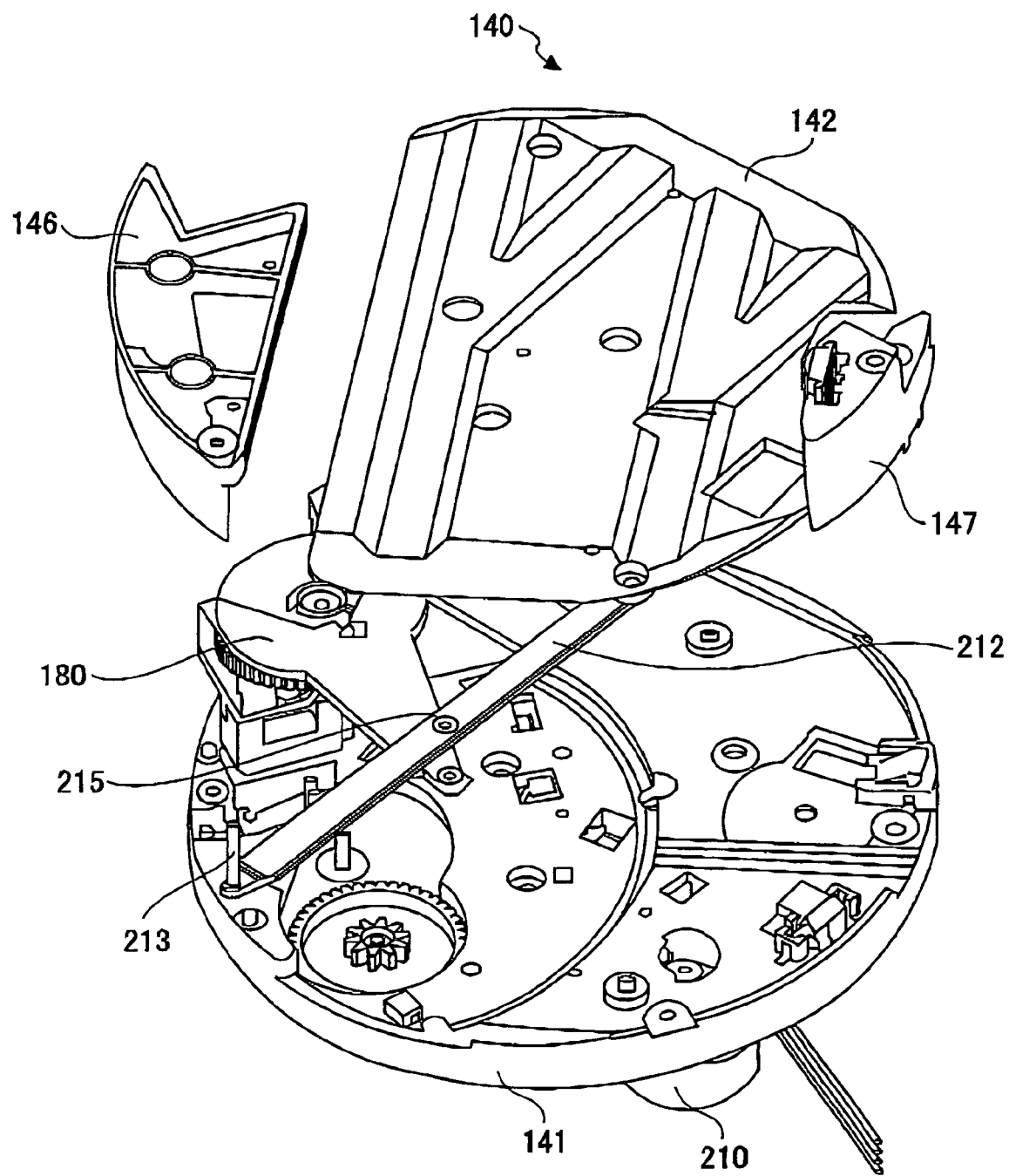
FIG. 24 is an exploded view of the turntable sub-assembly.
Figure 25:
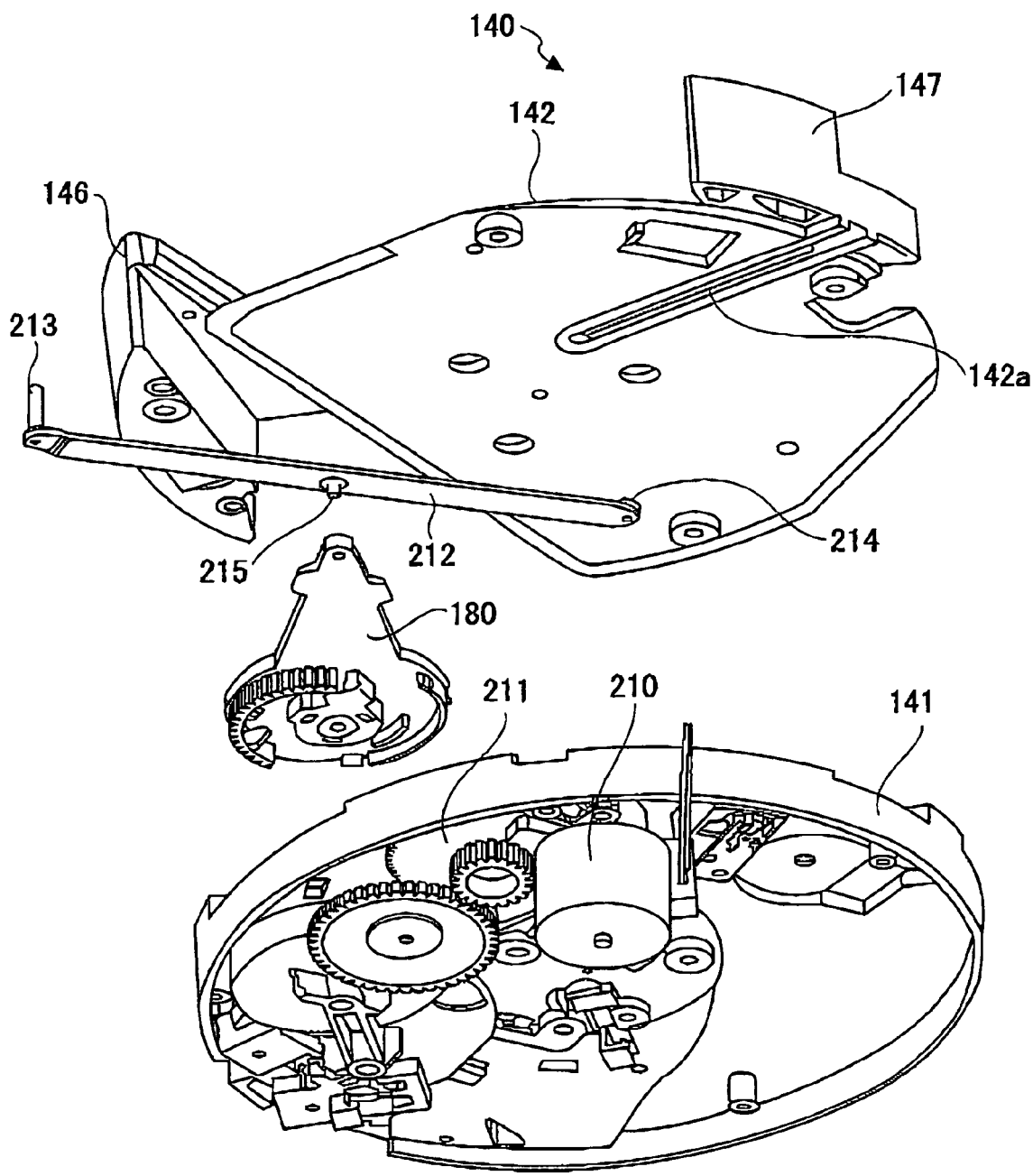
FIG. 25 is an exploded view of the turntable sub-assembly, viewed from the bottom.

FIG. 22 illustrates the turntable 140 with the upper plate 143 removed, which is referred to as a turntable sub-assembly 145. FIG. 23 illustrates the turntable sub-assembly 145 of FIG. 22 with a floor plate 142 and a tape cartridge guide 147 removed. FIG. 24 is an exploded view of the turntable subassembly 145 of FIG. 22. FIG. 25 is an exploded view of the turntable sub-assembly 145 of FIG. 22, viewed from the bottom. Tape cartridge guides 146, 147, and 148 shown in FIG. 22 are provided for guiding the movement of the tape cartridge 10 on the turntable 140.

Referring to FIG. 4, the tape cartridge picker 102 (FIG. 1) includes a base 120, the pillar 130 mounted on the base 120, the turntable 140 configured to support the tape cartridge 10, the turntable lifting mechanism 150 (FIG. 7) configured to slightly lift and lower the turntable 140 for height position adjustment, and a turntable rotating mechanism 160 (FIG. 5) configured to rotate the turntable 140 by a predetermined rotational increment, such as every 90 degrees, for example. In this embodiment, the tape cartridge picker 102 has ports 131X1, 131X2, 131Y1, and 131Y2 on four sides thereof.

In one embodiment, a rotating ring gear 161, a cylindrical stand 162, a lifting ring gear 163, and a sub base 164 are disposed on the base 120. The rotating ring gear 161 is rotatably attached on the base 120. The cylindrical stand 162 is arranged at the inner side of the rotating ring gear 161 and the lifting ring gear 163 so as to be rotated along with the rotating ring gear 161 and be lifted independently from the rotating ring gear 161, The lifting ring gear 163 is arranged at the upper side of the rotating ring gear 161 so as to be rotated independently from the rotating ring gear 161. A boss 162a of the cylindrical stand 162 is configured to engage a diagonal groove 163a of the lifting ring gear 163. When the ring gear 161 rotates, the cylindrical stand 162 is rotated. When the lifting ring gear 163 rotates, the cylindrical stand 162 is lifted/lowered. The sub base 164 is a semi-circular plate fixed to a position slightly separated from and at the upper side of the base 120.

Figure 8:
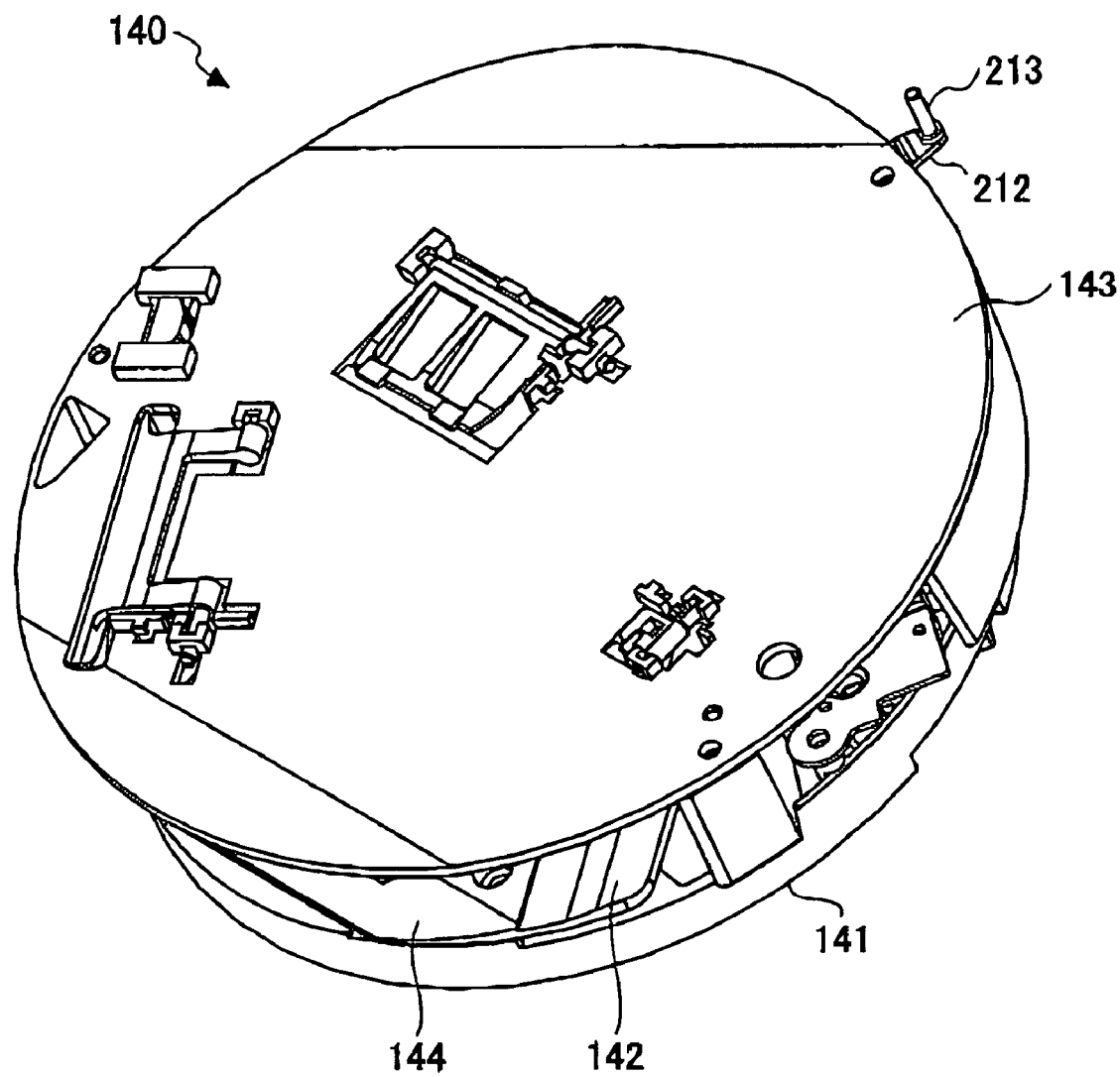
FIG. 8 is a perspective view illustrating a turntable.

Referring to FIG. 8, the turntable 140 includes a base plate 141, the floor plate 142, the upper plate 143, and a clearance 144 between the floor plate 142 and the upper plate 143 to receive the tape cartridge 10. The base plate 141 is screwed onto the cylindrical stand 162 (FIG. 7).

The tape cartridge 10 is slidably supported on an upper face of the floor plate 142. There is a flat clearance between the base plate 141 and the floor plate 142, in which a lever 212 (described below) is arranged.

Referring to FIGS. 5-7, the lifting mechanism 150 includes a stepping motor 151, a gear train 152, and the lifting ring gear 163. Both the stepping motor 151 and the gear train 152 are provided on the base plate 141.

As shown in FIG. 7, the turntable rotating mechanism 160 includes a stepping motor 165, a gear train 166, and the rotating ring gear 161, all of which are provided on the sub base 164.

In one embodiment, the lifting mechanism 150 has a function of initializing the turntable 140 by lifting/lowering the turntable 140 to a home position thereof in the Z direction. The turntable rotating mechanism 160 has a function of initializing the turntable 140 by rotating the turntable 140 to the home position in the rotation direction. The home position of the turntable 140 is a position where a y-axis (to be described later) becomes parallel to the Y-axis. This lifting mechanism initialization operation and the turntable rotating mechanism initialization operation apply a method of moving an object to an operation end position defined as a reference position, and then moving the object back by a predetermined distance. The same method is applied to operations for initializing a cartridge transporter (described below).

Figure 10:
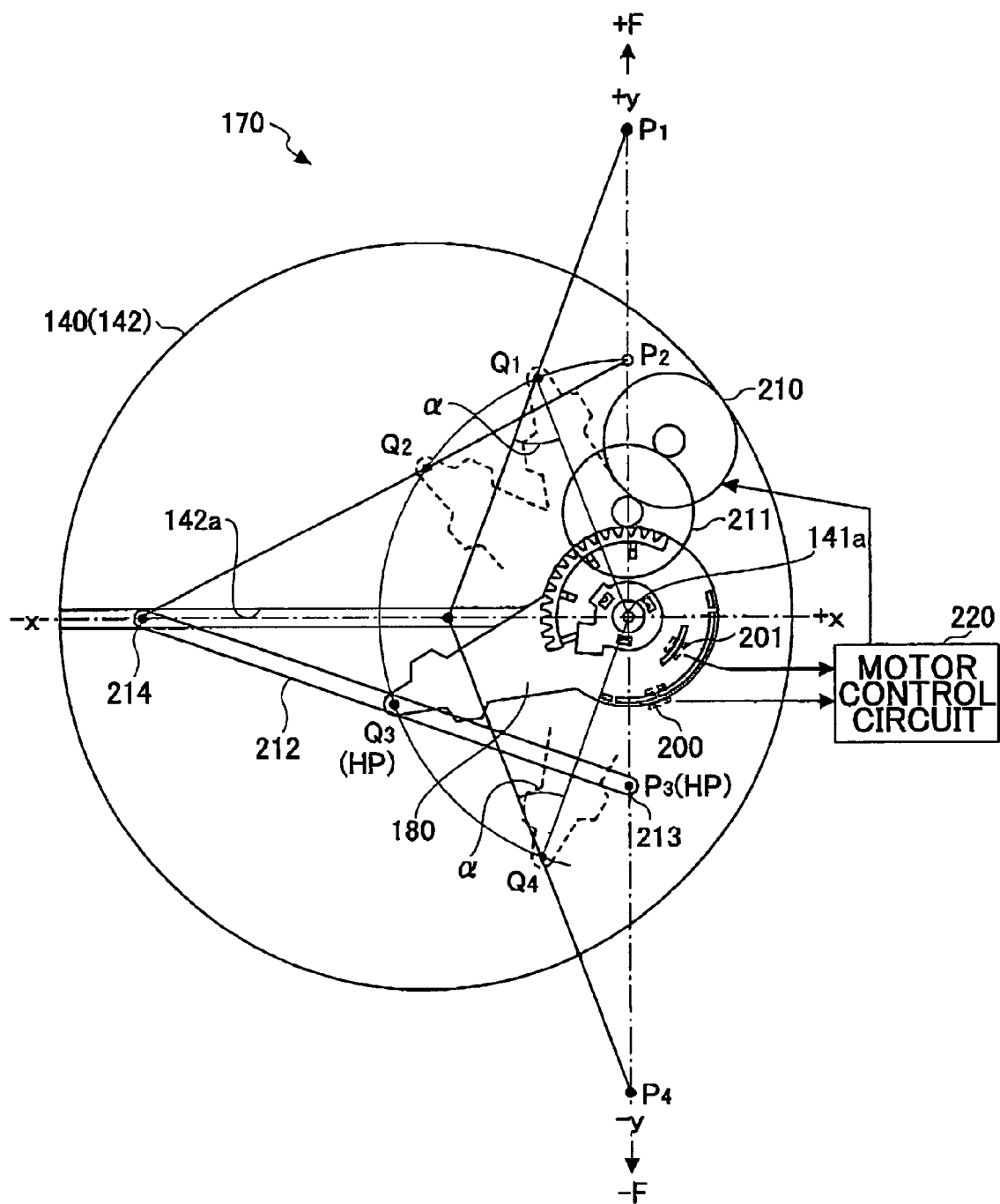
FIG. 10 is a schematic illustration showing a media cartridge linear transport mechanism.

Referring to FIG. 10, the turntable 140 applies coordinates for explanation purposes, wherein the position of a pin 141a (to be described below) is defined as the origin, a guide groove 142a (to be described below) as an x-axis, an axis passing through the origin and being orthogonal to the x-axis is defined as a y-axis.

A cartridge transporter 170 and a stepping motor 210 (to be described later), both shown in FIG. 10, are provided on the base plate 141.

The cartridge transporter 170 has a function of moving the tape cartridge 10 between a position on the turntable, i.e., a position in the clearance 144, and a position outside of the tape cartridge picker 102. In one embodiment, this movement can be substantially linear. In an alternative embodiment, the movement can be non-linear, such as arcuate or some other suitable non-linear movement that can depend upon the design requirements of the autoloader 100, As also shown in FIGS. 22-25, the cartridge transporter 170 includes a rotary arm 180 rotatably attached to the pin 141a formed on the base plate 141, the stepping motor 210 (FIG. 10) configured to reciprocally rotate the rotary arm 180 between positions Q1 and Q4 within a predetermined angular range, a reduction gear mechanism 211 configured to transmit the rotation of the motor 210 at a reduced rotation rate to the rotary arm 180, and the lever 212 with a center part rotatably connected to a tip end of the rotary arm 180. A cartridge pin 213 is vertically fixed to an end of the lever 212, while a guide pin 214 is fixed to the other end of the lever 212. The guide pin 214 engages a guide groove 142a formed on a lower face of the floor plate 142. In the embodiment illustrated in FIG. 10, the guide groove 142a is substantially linear. However, in an alternative embodiment, the guide groove 142a can have a non-linear configuration.

The pin 141a is located on an imaginary extended line of the guide groove 142a. The stepping motor 210 is attached on a lower face of the base plate 141. The upper end of the cartridge pin 213 projects above the level of the upper face of the floor plate 142. In the embodiment illustrated in FIG. 23, an arm length A, an arm length B, and an arm length C, are equal to each other.

Figure 9B:
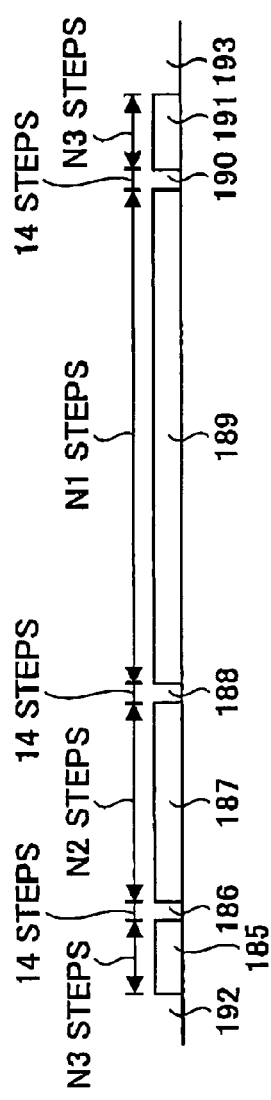
FIGS. 9B and 9C are signal waveform diagrams.
Figure 9C:
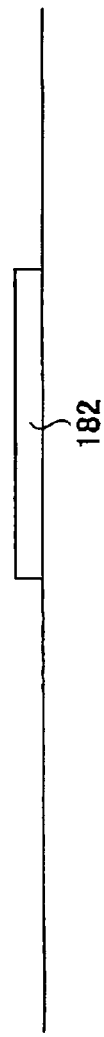
Figure 9A:
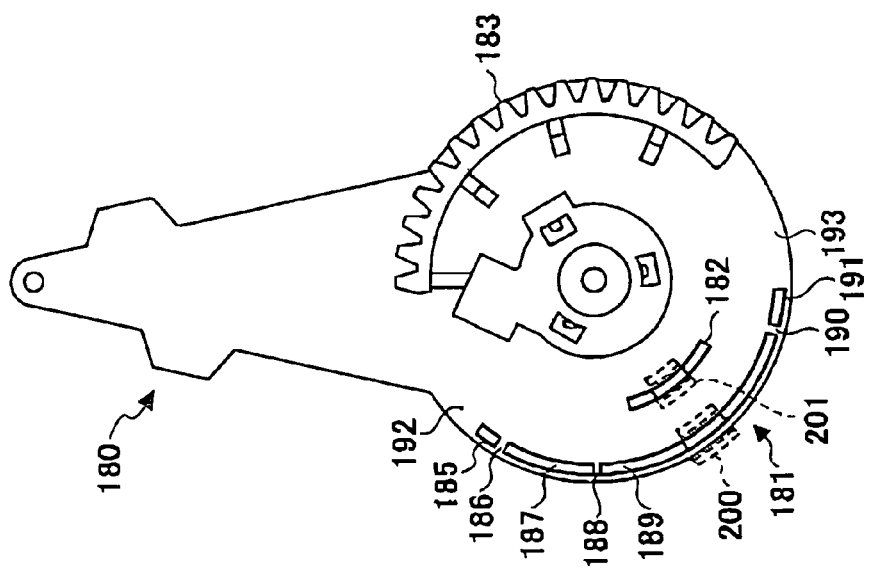
FIG. 9A illustrates a rotary arm.

FIG. 9A illustrates the rotary arm 180 from the Z1 side. Although flags are formed on a lower face of the rotary arm 180, they are indicated by solid lines for purposes of illustration. A flag array 181, a flag 182 coaxial to the flag array 11, and a gear section 183 are formed on the rotary arm 180. The flag array 181 includes a flag 185, a slit 186, a flag 187, a slit 188, a flag 189, a slit 190, and a flag 191 in the order of the counterclockwise direction, a non-flag section 192 serving as a "special shape section" (second-shaped section) at the clockwise direction side of the flag 185, and a non-flag section 193 also serving as a "special shape section" (second-shaped section) at the counterclockwise direction side of the flag 191. That is, the flag 187, the slit 186, and the flag 185 are arranged in the clockwise direction from the slit 188, while the flag 189, the slit 190, and the flag 191 are arranged in the counterclockwise direction from the slit 188. The flag 189 is the longest, and is longer than the flag 187. The flags 185 and 191 arranged on opposing ends have substantially the same length, and are shorter than the flag 187.

A photo sensor 200 opposing the flag array 181, and a photo sensor 201 opposing the flag 182 are attached to predetermined positions on the base plate 141.

When the rotary arm 180 is rotated in the clockwise direction or the counterclockwise direction at a constant speed, the photo sensor 200 outputs signals in the waveform shown in FIG. 9B. The photo sensor 200 outputs "1" while opposing the flags, and outputs "0" while opposing the slits. The widths of all the slits 186, 188, and 190 are equal to each other and correspond to 14 steps of the motor 210. The output "0" lasts more than 14 steps on the non-flag sections 192 and 193, and, in this point, it is different from the output on the slits 186, 188, and 190. This difference is utilized to detect a reference position P1 in the present invention.

The slit 188 is provided for determination of a home position, while the slits 186 and 190 are provided for recognition of the rotating position of the rotary arm 180.

When the rotary arm 180 is rotated in the clockwise direction or the counterclockwise direction at a constant speed, the photo sensor 201 outputs signals in the waveform shown in FIG. 9C. The signals are utilized for a preparation operation, which is described below in detail.

Referring to FIG. 10, when the motor 210 is driven, the rotary arm 180 is rotated through the reduction gear mechanism 211. Then, the guide pin 214 is moved within the guide groove 142a along the x-axis, while rotating the lever 212 and moving the cartridge pin 213 linearly between positions P1 and P2 along the y-axis. The lever 212 rotates about the guide pin 214 in the flat clearance between the base plate 141 and the floor plate 142. Alternatively, the cartridge pin 213 can be moved non-linearly or can combine linear and non-linear movements.

When the rotary arm 180 is rotated from the position Q1, Q2, Q3 to Q4, the cartridge pin 213 is correspondingly moved from the position P1, P2, P3 to P4.

A force +F in +y direction is generated due to a movement of the cartridge pin 213 in the +y direction.

The force +F increases as a tangent force, which acts on the lever 212 at the tip end of the rotary arm 180, increases.

An angle α formed by the rotary arm 180 and the lever 212 becomes smaller as the cartridge pin 213 moves toward the position P1 in the +y direction relative to the x axis, and minimized when the cartridge pin 213 reaches the position P1. The tangent force acting on the lever 212 increases as the angle α becomes smaller. The force +F is maximized when the cartridge pin 213 reaches the position P1 in the +y direction.

Similarly, a force −F generated due to a movement of the cartridge pin 213 in −y direction is maximized when the cartridge pin 213 reaches the position P4 in the −y direction.

According to this aspect, the stepping motor 210 that has a smaller drive force and is less expensive than the conventional one may be used.

FIG. 11A1 shows the rotary arm 180 rotated to the position Q2 and the cartridge pin 213 correspondingly moved to the position P2 defined as a preparation operation completed position, In this state, as shown in FIG. 11B1, the center part of the flag 182 opposes the photo sensor 201, and the flag 189 opposes the photo sensor 200. The preparation operation completed position P2 is located within the turntable 140 such that the turntable 140 is rotated without causing the cartridge pin 213 to hit against a column section at a corner section of the pillar 130.

FIG. 11A2 shows the rotary arm 180 rotated maximally in the clockwise direction to the position Q1 and the cartridge pin 213 correspondingly moved to the reference position P1. In this state, as shown in FIG. 11B2, the non-flag section 193 opposes the photo sensor 200. The flag 182 is out of the focus of the photo sensor 201 and does not oppose the photo sensor 201. The reference position P1 is located outside the turntable 140, and is defined as a start position from which the cartridge pin 213 is moved to the home position P3. Also, the reference position P1 is where the cartridge pin 213 is located when the front face 13 of the tape cartridge 10 is completely pushed out as described below.

FIG. 11A3 shows the rotary arm 180 rotated from the position Q1 to the home position Q3 in the counterclockwise direction and the cartridge pin 213 correspondingly moved to the home position P3. In this state, as shown in FIG. 11B3, the slit 188 opposes the photo sensor 200. The flag 182 is out of the focus of the photo sensor 201, and does not oppose the photo sensor 201. The home positions are where the rotary arm 180 and the cartridge pin 213 are located when the tape cartridge picker 102 starts an operation according to a command.

Figure 12A:
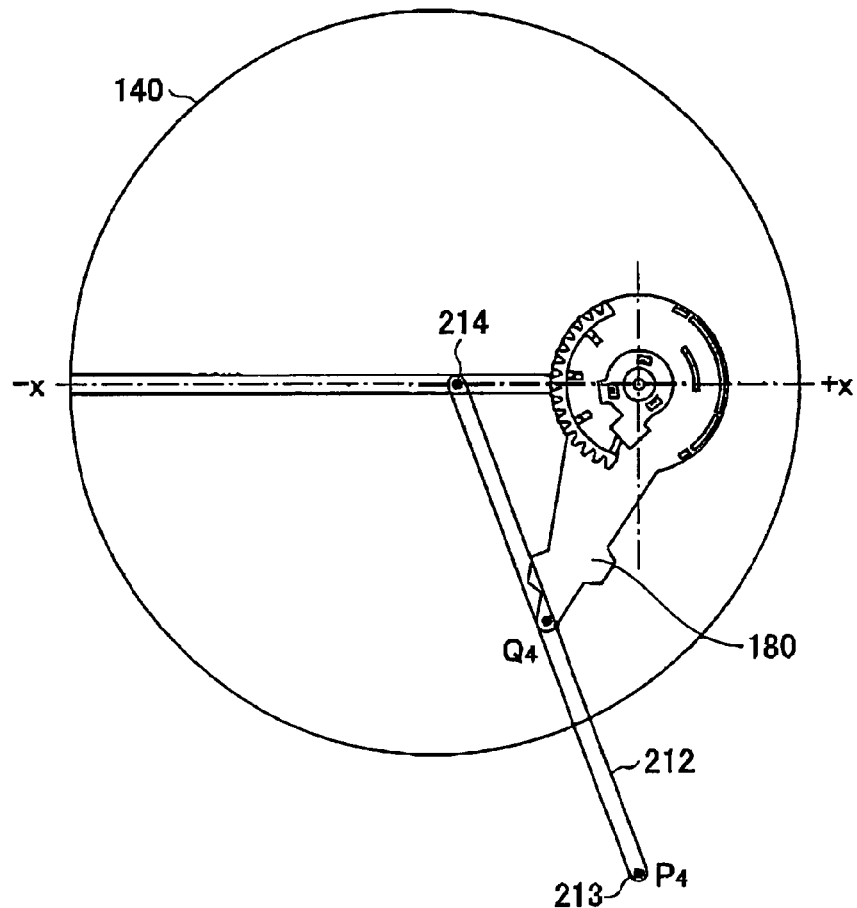
FIGS. 12A and 12B each illustrate an operational state of the media cartridge linear transport mechanism at the time when the rotation arm is maximally rotated in the counter-clockwise direction.
Figure 12B:
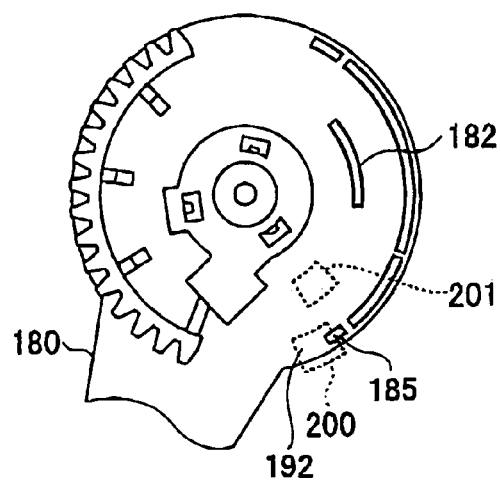

FIG. 12A shows the rotary arm 180 rotated maximally in the counterclockwise direction to the position Q4 and the cartridge pin 213 correspondingly moved out of the turntable 140 to the position P4. In this state, as shown in FIG. 12B, the non-flag section 192 opposes the photo sensor 200. The flag 182 is out of the focus of the photo sensor 201 and does not oppose the photo sensor 201.

3 [Initialization Operation of Cartridge transporter 170]

In one embodiment, when the tape cartridge autoloader 100 is turned on, the motor is operated by a control circuit 220 as follows. The control circuit 220, comprising a microcomputer, is configured to drive or stop the stepping motor 210.

First, a preparation operation is conducted. In the preparation operation, the motor 210 is stopped according to the output of the photo sensor 201.

More specifically, the motor 210 first rotates in the clockwise direction and, if necessarily, subsequently rotates in the counterclockwise direction until the output of the photo sensor 201 becomes "1". The motor 210 is stopped after being further operated predetermined steps from the point where the output becomes "1". With these operations, the cartridge transporter 170 is put in the state shown in FIGS. 11A1 and 11B1, and the cartridge pin 213 is located on the position P2 within the turntable 140. The preparation operation is thus completed.

Next, the turntable rotating mechanism 160 performs turntable rotation direction initialization so as to move the turntable 140 to the home position in the rotation direction, and then the initialization operation of the tape cartridge picker 102 is started. The cartridge transporter 170 is put in the state shown in FIGS. 11A2 and 11B2, and eventually put in the state shown in FIGS. 11A2, 11A3, 11B2 and 11B3. The motor 210 is stopped according to the output of the photo sensor 200.

More specifically, the motor 210 is started again to rotate in the clockwise direction, so that the rotary arm 180 is rotated in the clockwise direction. When the non-flag section 193 opposes the photo sensor 200, the motor 210 is stopped. The point when the motor 210 is stopped is when the motor 210 is operated over 14 steps to reach 16 steps from the point when the output from the photo sensor 200 becomes "0".

The cartridge transporter 170 is put in the state shown in FIGS. 11A2 and 11B2, and the cartridge pin 213 is moved to the reference position P1.

Then, the motor 210 is started again to rotate in the counterclockwise direction, so that the rotary arm is rotated in the counterclockwise direction. The flag 185, the slit 186, and the flag 187 sequentially pass through the photo sensor 200. When an edge of the flag 187 at the side of the slit 188 is detected by the photo sensor 200, the output of the photo sensor 200 becomes "0". The motor 210 stops after being operated 7 more steps, a half of 14 steps, from the point where the output becomes "0". The rotary arm 180 stops at the position where the center of the slit 188 opposes the photo sensor 200.

The cartridge transporter 170 is put in the state shown in FIGS. 11A3 and 11B3, and the rotary arm 180 and the cartridge pin 213 are moved to the corresponding home positions Q3 and P3 (HP). The initialization operation is thus completed.

In the initialization operation, the rotary arm 180 dose not hit against a stopper, i.e., the cartridge transporter 170 is not damaged. Therefore, the durability of the tape cartridge autoloader 100 is improved.

4 [Operation of Microcomputer of Control Circuit 220]

Figure 13:
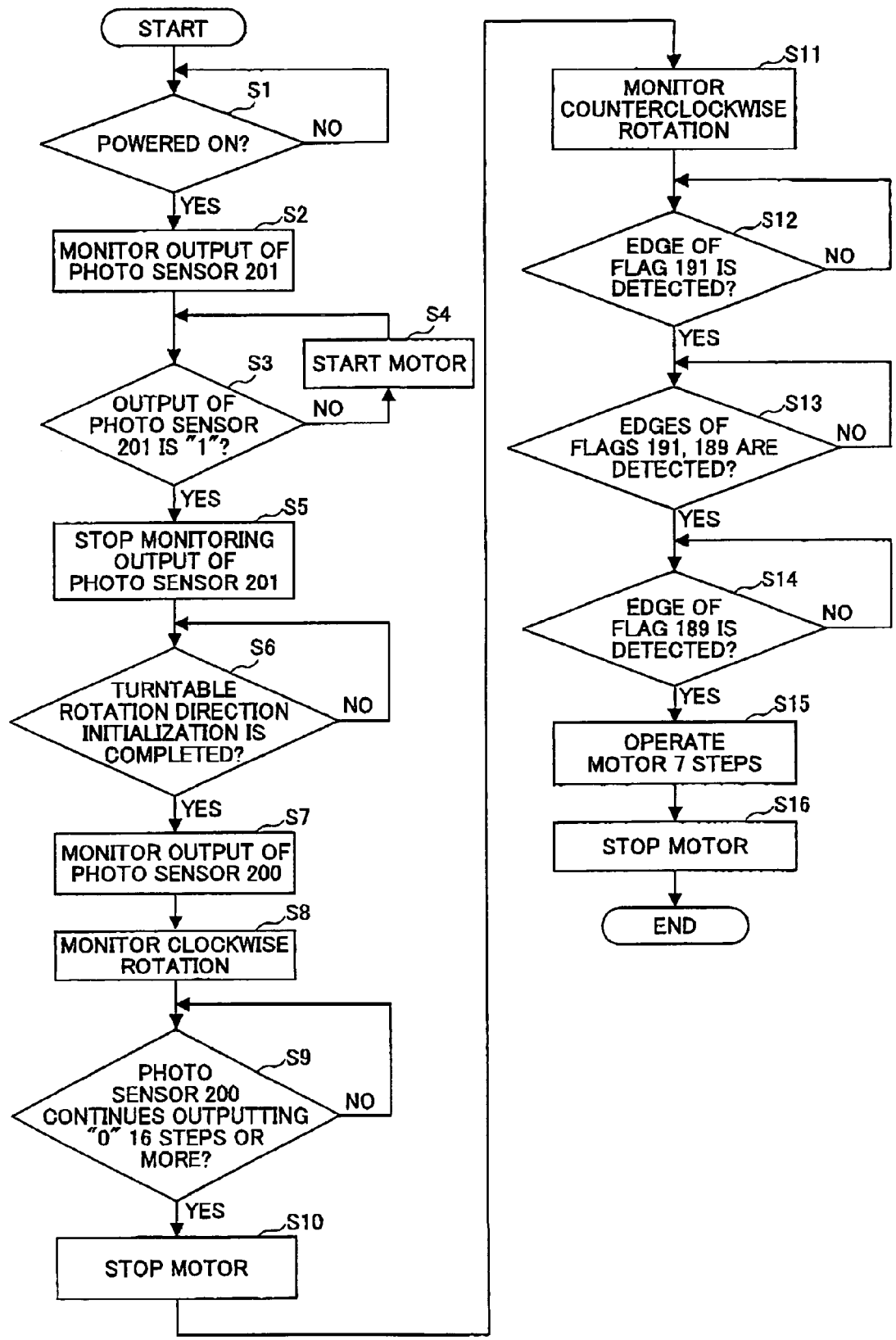
FIG. 13 is a flowchart of operations of a control circuit for causing the media cartridge linear transport mechanism to perform an initialization operation.

The microcomputer of the control circuit 220 operates as shown in FIG. 13.

When the power is turned on, the output of the photo sensor 201 is monitored (S1, S2). If the output of the photo sensor 201 is not "1", the motor 210 is driven (S3, S4). If the output of the photo sensor 201 becomes "1", the monitoring of the output of the photo sensor 201 is stopped (S3, S5). Then, if the turntable rotation direction initialization is completed, the output of the photo sensor 200 is monitored, and the motor 210 is driven in the clockwise direction (S6, S7, S8). If the photo sensors 200 continues outputting "0" 16 steps or more, the motor 210 is stopped (S9, S10). The motor 210 is then rotated in the counterclockwise direction (S11). The microcomputer confirms that the photo sensor 200 detects an edge of the flag 191 (S12), the other edge of the flag 191 and an edge of the flag 189 (S13) opposing thereto (S13), and the other edge of the flag 189 (S14). The motor 210 is operated 7 more steps from the point when the detection of the other edge of the flag 189 is confirmed (S15), and then the motor 210 is stopped (S16).

5 [Initialization Operation of Tape Cartridge Picker 102]

Figure 14:
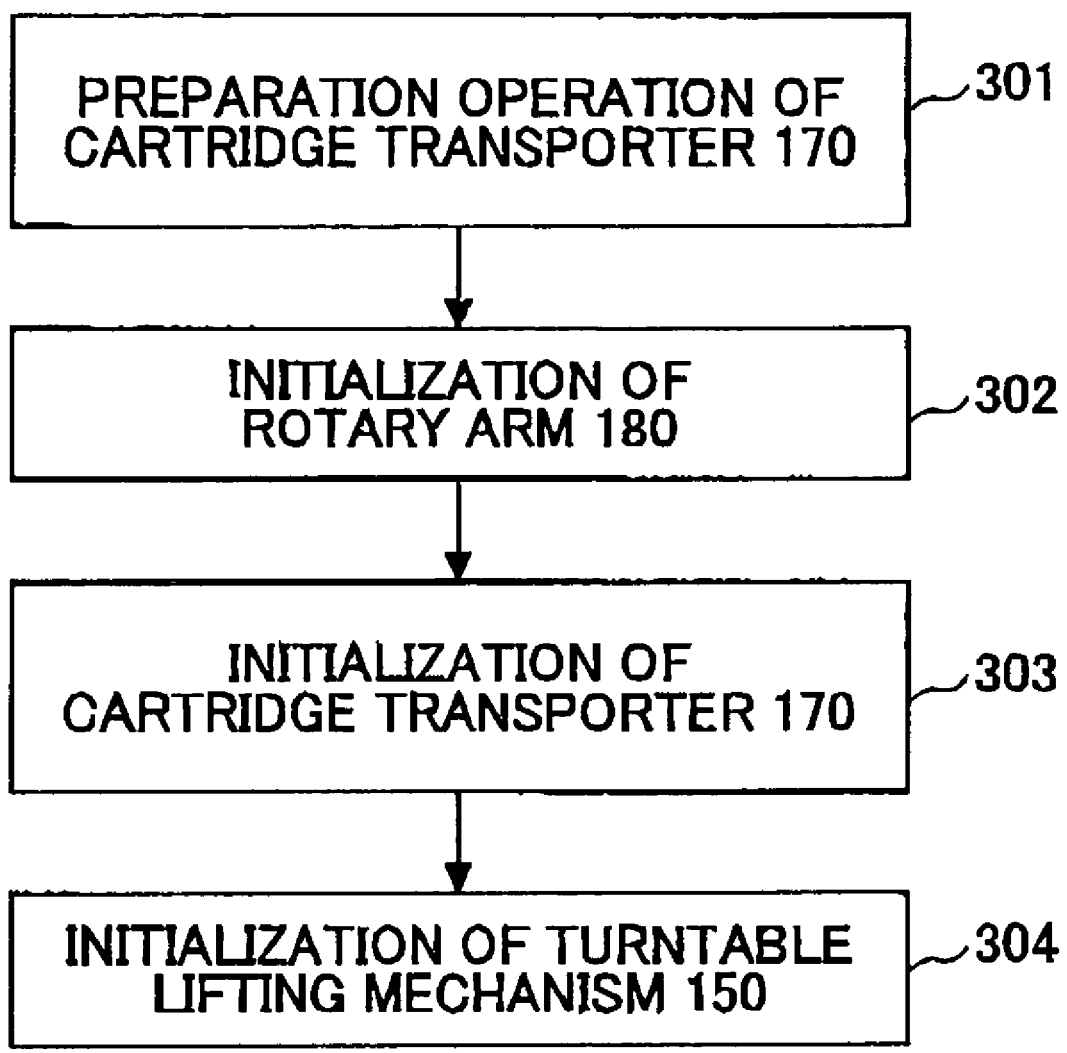
FIG. 14 is a flowchart of an initialization operation of the media cartridge autoloader.

When the tape cartridge autoloader 100 is turned on, the tape cartridge picker 102 is operated as shown in FIG. 14 under the control of the microcomputer so as to be initialized in the three axial directions.

First, the preparation operation of the cartridge transporter 170 is conducted (301).

Then, the turntable rotating mechanism 160 performs the turntable rotation direction initialization so as to move the turntable 140 to the home position in the rotation direction (302).

Then, the cartridge transporter 170 is initialized as described above (303).

Then, the turntable lifting mechanism 150 performs initialization to lift/lower the turntable 140 to the home position in the Z direction (304). Thus, initialization in the three axial directions, i.e., the Y-direction, the rotation direction, and the Z-direction is completed.

Because the initialization is performed in the order described above, initialization operations can be conducted without the cartridge pin 213 and the end on the lever 212 hitting against the column sections at the four corners of the pillar 130.

6 [Operation of Tape Cartridge Picker 102]

After the tape cartridge picker 102 is initialized in the three axial directions as described above, the tape cartridge picker 102 is operated as follows according to commands corresponding to control inputs from the control panel 105.

(1) Transporting the Tape Cartridge 10, Inserted from the Mail Slot 107, onto the Turntable 140 (FIGS. 15A-15F)

Referring to FIG. 15A, the tape cartridge picker 102 is initialized, and the turntable lifting mechanism 150 lifts/lowers the turntable 140 to align it with the mail slot 107.

Then, the turntable 140 is rotated 30 degrees in the counterclockwise direction by the turntable rotating mechanism 160 (see FIG. 15B).

In this state, the tape cartridge 10 is inserted from the mail slot 107 by an operator (see FIG. 15C).

Then, the cartridge transporter 170 operates to be in the state shown in FIGS. 12A and 12B, and the cartridge pin 213 is moved out of the turntable 140 to the position P4 (see FIG. 15D).

Then, the turntable 140 is rotated 30 degrees in the clockwise direction by the turntable rotating mechanism 160, so that the cartridge pin 213 engages the notch 15a (see FIG. 15E).

Finally, the cartridge transporter 170 operates to be in the state shown in FIG. 11A3, so that the tape cartridge 10 is transported in the Y-direction to be placed within the turntable 140.

(2) Ejecting the Tape Cartridge 10, Placed on the Turntable 140, from the Mail Slot 107 (FIGS. 16A-16F)

The tape cartridge picker 102 is operated in the reverse order and in the opposite direction of the operation for transporting the tape cartridge 10 from the mail slot onto the turntable 140.

The cartridge transporter 170 operates to be in the state shown in FIGS. 12A and 12B from the state shown in FIG. 16A, and the cartridge pin 213 is moved to the position P4. Meanwhile, the tape cartridge 10 is transported in the Y2 direction so that a part thereof is located outside the turntable 140 (see FIG. 16B). The tape cartridge 10 has not crossed the mail slot 107 yet.

Then, the turntable 140 is rotated 30 degrees in the counterclockwise direction, so that the cartridge pin 213 disengages from the notch 15a (see FIG. 16C).

Then, the cartridge transporter 170 operates to be in the state shown in FIG. 11A3 (see FIG. 16D). Subsequently, the turntable 140 is rotated 30 degrees to the original position (see FIG. 16E). Finally, the cartridge transporter 170 operates to be in the state shown in FIGS. 12A and 12B again, so that the cartridge pin 213 pushes hard on the rear face 14 of the tape cartridge 10 (see FIG. 16F). Thus, the tape cartridge 10 is transported further in the Y2 direction to be ejected from the mail slot 107.

(3) Loading the Tape Cartridge 10, Placed on the Turntable 140, into the Tape Drive 101 (FIGS. 17A-17F)

First, the height of the turntable 140 is adjusted to the height of the tape drive 101 (see FIG. 17A). Then, the cartridge transporter 170 operates to be in the state shown in FIG. 11A2, and the cartridge pin 213 is moved to the position P1. Meanwhile, the tape cartridge 10 is transported in the Y2 direction so that the whole part thereof is located outside the turntable 140 (see FIG. 17B). A part of the tape cartridge 10 is inserted into the tape drive 101.

Then, the turntable 140 is rotated 3.5 degrees in the clockwise direction, so that the cartridge pin 213 disengages from the notch 15a (see FIG. 17C).

Then, the cartridge transporter 170 operates to be in the state shown in FIG. 11A1 (see FIG. 17C). Subsequently, the turntable 140 is rotated 20 degrees, so that the cartridge pin 213 opposes the front face 13 of the tape cartridge 10 (see FIG. 17E). Finally, the cartridge transporter 170 operates to be in the state shown in FIG. 11A2 again, so that the cartridge pin 213 pushes the front face 13 of the tape cartridge 10 (see FIG. 17F) As the tape cartridge 10 is pushed hard by the cartridge pin 213, the tape cartridge 10 is securely loaded into the tape drive 101.

(4) Retrieving the Tape Cartridge 10, Loaded in the Tape Drive 101, and Transporting it onto the turntable 140 (FIGS. 18A-18E)

The tape drive 101 includes an ejecting mechanism. The tape cartridge 10 loaded in the tape drive 101 is ejected by the ejecting mechanism to a position near the turntable 140 as shown in FIG. 18C.

The turntable 140 is rotated 3.5 degrees in the clockwise direction from the position shown in FIG. 18A. (see FIG. 18B). Then, the cartridge transporter 170 operates to be in the state shown in FIG. 11A2, and the cartridge pin 213 is moved to the position P1 (see FIG. 18C). Subsequently, the turntable 140 is rotated 3.5 degrees in the counterclockwise direction to the original direction, so the cartridge pin 213 engages the notch 15a (see FIG. 18D). Then, the cartridge transporter 170 operates to be in the state shown in FIG. 11A3, and the tape cartridge 10 is transported in the Y2 direction onto the turntable 140 (see FIG. 18E).

(5) Retrieving the Tape Cartridge 10, Stored in the Tape Cartridge Transport Magazine 103, and Transporting it onto the Turntable 140 (FIGS. 19A-19E)

First, the height of the turntable 140 is adjusted to the height of the magazine 103 (see FIG. 19A). Then, the turntable 140 is rotated 93.5 degrees in the clockwise direction (see FIG. 19B). Then, the cartridge transporter 170 operates to be in the state shown in FIG. 11A2, and the cartridge pin 213 is moved to the position P1 (see FIG. 19C). Subsequently, the turntable 140 is rotated 3.5 degrees in the counterclockwise direction, so the cartridge pin 213 engages the notch 15a (see FIG. 19D). Then, the cartridge transporter 170 operates to be in the state shown in FIG. 11A3, and the tape cartridge 10 is transported in the X2 direction onto the turntable 140 (see FIG. 19E).

The tape cartridge 10 stored in the tape cartridge transport magazine 104 at the X2 side can be retrieved and transported onto the turntable 140 in the same manner as the operations described above except that the turntable 140 is rotated in the opposite direction.

(6) Transporting the Tape Cartridge 10, Placed on the Turntable 140 into the Tape Cartridge transport Magazine 103 (FIGS. 20A-20E)

Figure 20A:
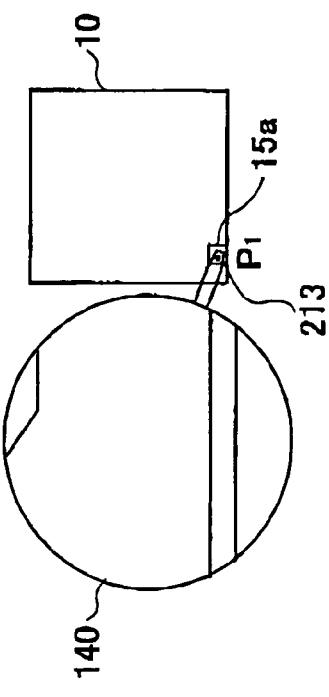
FIGS. 20A-20E illustrate operations of the media cartridge picker for transporting the media cartridge, placed on the turntable, into the media cartridge transport magazine.
Figure 20B:
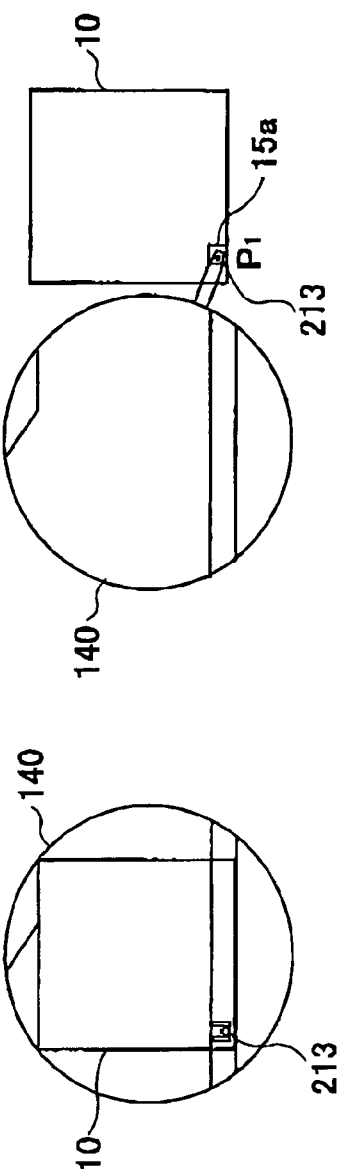
Figure 20C:
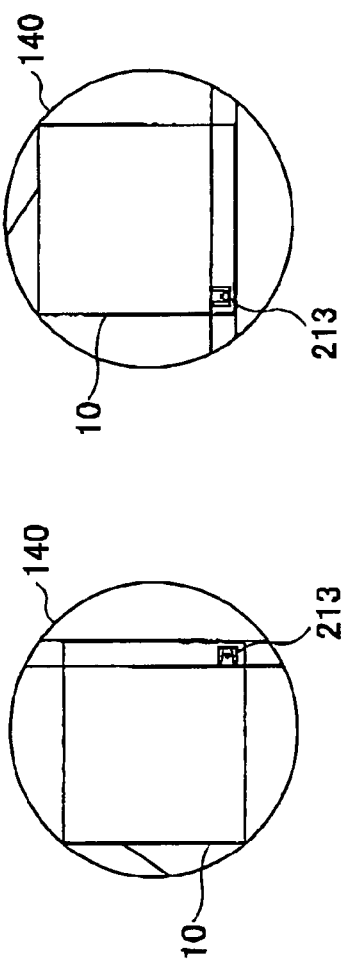

First, the height of the turntable 140 is adjusted to the height of the magazine 103 (see FIG. 20A). Then, the turntable 140 is rotated 90 degrees in the clockwise direction (see FIG. 20B). Then, the cartridge transporter 170 operates to be in the state shown in FIG. 11A2, and the cartridge pin 213 is moved to the position P1. Meanwhile, the tape cartridge 10 is transported in the X1 direction into the magazine 103 (see FIG. 20C).

Figure 20D:
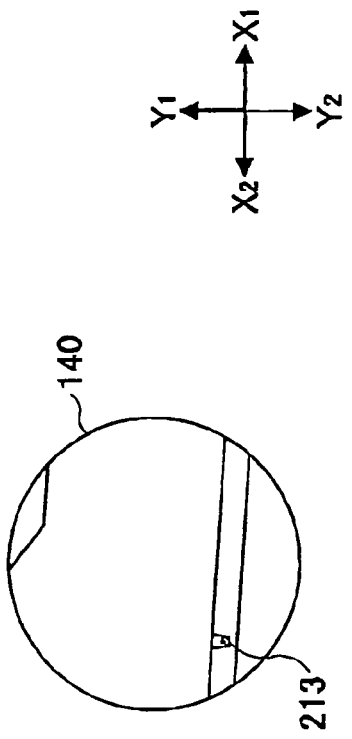
Figure 20E:
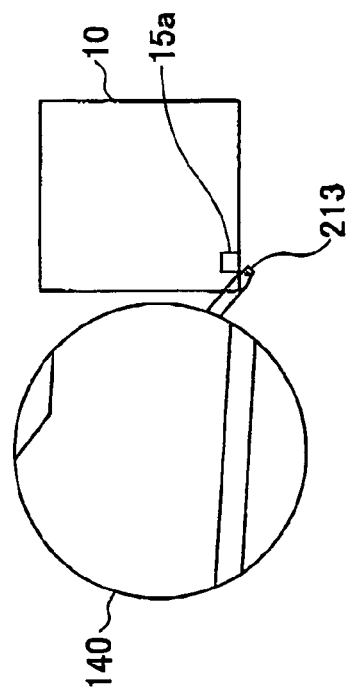

Then, the turntable 140 is rotated 3.5 degrees in the clockwise direction, so that the cartridge pin 213 disengages from the notch 15a (see FIG. 20D). Finally, the cartridge transporter 170 operates to be in the state shown in FIG. 11A3 (see FIG. 20E).

The tape cartridge 10 placed on the turntable can be transported into the tape cartridge transport magazine 104 at the X2 side in the same manner as the operations described above except that the turntable 140 is rotated in the opposite direction.

7 [Additional Advantage of Flag Array 181]

Referring back to FIG. 9A, in the flag array 181, the flag 189 is the longest, and is longer than the flag 187. The flags 185 and 191 arranged on opposing ends are shorter than the flag 187. In the waveform shown in FIG. 9B resulted from the flag array 161, the flag 189 has a length corresponding to N1 steps of the stepping motor 210, and the flag 187 has a length corresponding to N2 steps of the stepping motor 210. The flags 185 and 191 each have a length corresponding to N3 steps of the motor 210. As such, because the flags have different lengths, the number of steps of the motor 210 corresponding to each of the flags, i.e., the number of steps of the motor 210 that each of the flags needs for passing through the photo sensor 200 differs from one another.

Accordingly, the flag that has passed through the photo sensor 200 is identified based on the number of steps of the motor 210 that the flag needed for passing through the photo sensor 200. The rotating position of the rotary arm 180 is therefore identified. Eventually, the position of the cartridge pin 213 and the operational state of the cartridge transporter 170 are identified.

Second Embodiment

Figure 21A:
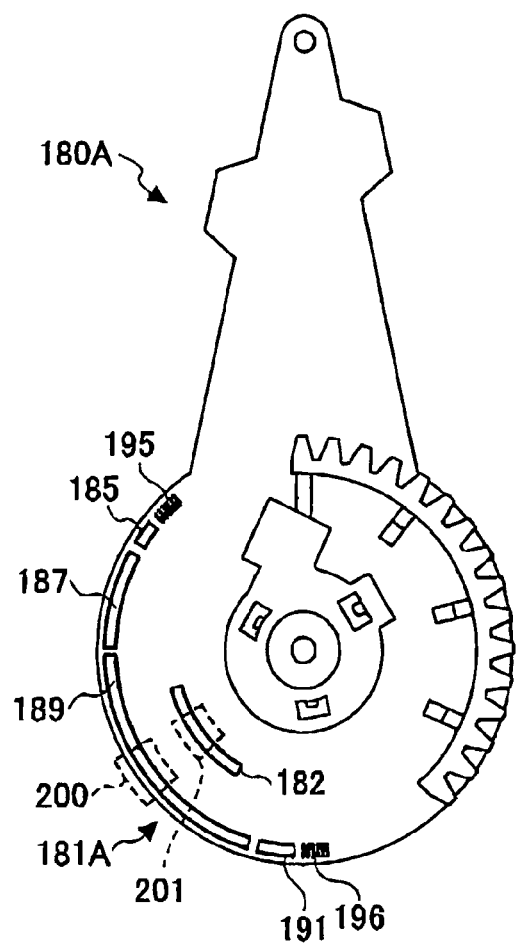
FIGS. 21A and 21B illustrate another rotary arm and is a signal waveform diagram, respectively.

FIG. 21A illustrates a rotary arm 180A. The rotary arm 180A includes comb sections 195 and 196 in place of the non-flag sections 192 and 193 provided on opposing ends of the flag array 181. Each of the comb sections 195 and 196 has multiple narrow teeth serving as a "special shape section".

Figure 21B:
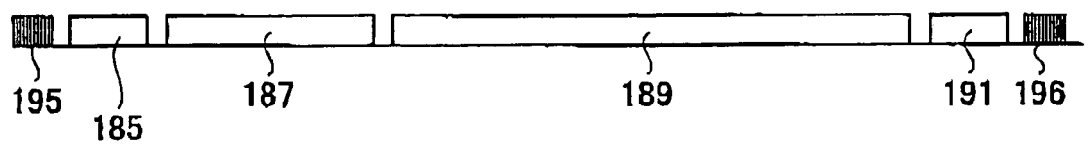

FIG. 21B illustrates the waveform output from the photo sensor 200 when the rotary arm 180A is rotated at a constant speed.

While the comb sections 195 and 196 pass through the photo sensor 200, the photo sensor 200 outputs a unique waveform with multiple short pulses, which is different from the waveform produced while the flag array 181 passes through the photo sensor 200.

Therefore, it can be recognized that the rotary arm 180A is rotated to the reference position by detecting the waveform output from the photo sensor 200 that is changed to the unique waveform having multiple short pulses.

The present application is based on Japanese Priority Application No. 2005-185492 filed on Jun. 24, 2005, and Japanese Priority Application No. 2005-264078 filed on Sep. 12, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader comprising:
   a media cartridge picker including
      a turntable capable of supporting a media cartridge and rotating to change the orientation of the media cartridge supported thereby;
      a turntable rotating mechanism configured to rotate the turntable; and
      a media cartridge transport mechanism provided on the turntable and configured to transport the media cartridge onto and off of the turntable;
   a mail slot through which the media cartridge is inserted or ejected;
   at least one media drive into which the media cartridge is loaded; and
   at least one media cartridge storage section configured to store the media cartridge therein;
   wherein the mail slot, the read/write media drive, and the media cartridge storage section are arranged near the media cartridge picker;
   the media cartridge transport mechanism includes
      a rotary arm configured to rotate bilaterally;
      a drive mechanism configured to rotate the rotary arm;

an arm position detector configured to detect a position of the rotated rotary arm; and a media cartridge pin configured to move between a position within the turntable and a position outside the turntable in conjunction with the rotation of the rotary arm, so as to transport the media cartridge;

the rotary arm has a reference position such that the media cartridge pin is located outside the turntable, and a home position such that the media cartridge pin is located within the turntable, and is configured to be positioned at the home position as a result of rotating in one direction to the reference position and then rotating in the opposite direction through a predetermined angle, the rotary arm including a special shape section that opposes the arm position detector when the rotary arm is rotated to the reference position and has a different shape from a normal section of the rotary arm; and the arm position detector detects an arrival of the rotary arm at the reference position in response to a detection of the special shape section.

2. The media cartridge autoloader as claimed in claim 1, wherein the normal section of the rotary arm includes a plurality of flags; and the special shape section of the rotary arm does not include a flag.

3. The media cartridge autoloader as claimed in claim 1, wherein the normal section of the rotary arm includes a plurality of flags; and the special shape section of the rotary arm includes a comb section.

4. The media cartridge autoloader as claimed in claim 2, wherein the flags have different lengths: and the arm position detector is configured to detect the rotating position of the rotary arm according to information obtained from the flags.

5. The media cartridge autoloader as claimed in claim 1, wherein when the media cartridge autoloader is turned on, the media cartridge transport mechanism performs a preparation operation for positioning the media cartridge pin within the turntable by rotating the rotary arm.

6. The media cartridge autoloader as claimed in claim 1, further comprising:

a turntable lifting mechanism configured to lift and lower the turntable.

7. The media cartridge autoloader as claimed in claim 6, wherein when the media cartridge autoloader is turned on, the media cartridge transport mechanism performs a preparation operation for positioning the media cartridge pin within the turntable by rotating the rotary arm;

then the turntable rotating mechanism performs turntable rotating mechanism initialization for rotating the turntable to change the orientation of the turntable to a predetermined orientation;

then the media cartridge transport mechanism performs media cartridge transport mechanism initialization for positioning the rotary arm at the home position; and then the turntable lifting mechanism performs turntable lifting mechanism initialization for lifting/lowering the turntable to a predetermined position.

8. The cartridge picker, for a media cartridge autoloader that moves a media cartridge between two or more of a mail slot, a media drive and a cartridge storage section, the cartridge picker comprising:

a rotatable turntable that supports the media cartridge; and a cartridge transporter that transports the media cartridge between the turntable and one of the mail slot, the media drive or the cartridge storage section, the cartridge transporter including (i) a cartridge pin that engages the media cartridge to move the media cartridge relative to the turntable, (ii) a rotary arm that rotates to change the position of the cartridge pin between a reference position located outside the turntable and a home position located within the turntable, the rotary arm including a first-shaped section and a second-shaped section that has a different shape than the first-shaped section. and (iii) an arm position detector that detects a rotational position of at least one of the sections to determine an arrival of the cartridge pin at the reference position;

wherein the cartridge pin is positioned at the home position by rotating the rotary arm in one direction until cartridge pin arrives at the reference position, and then rotating the rotary arm in the opposite direction through a predetermined angle;

wherein the first-shaped section of the rotary arm includes a plurality of flags; and the second-shaped section of the rotary arm does not include a flag.

9. The cartridge picker for a media cartridge autoloader that moves a media cartridge between two or more of a mail slot, a media drive and a cartridge storage section, the cartridge picker comprising:

a rotatable turntable that supports the media cartridge; and a cartridge transporter that transports the media cartridge between the turntable and one of the mail slot, the media drive or the cartridge storage section, the cartridge transporter including (i) a cartridge pin that engages the media cartridge to move the media cartridge relative to the turntable, (ii) a rotary arm that rotates to change the position of the cartridge pin between a reference position located outside the turntable and a home position located within the turntable, the rotary arm including a first-shaped section and a second-shaped section that has a different shape than the first-shaped section, and (iii) an arm position detector that detects a rotational position of at least one of the sections to determine an arrival of the cartridge pin at the reference position;

wherein the cartridge pin is positioned at the home position by rotating the rotary arm in one direction until cartridge pin arrives at the reference position, and then rotating the rotary arm in the opposite direction through a predetermined angle;

wherein the first-shaped section of the rotary arm includes a plurality of flags; and the second-shaped section of the rotary arm includes a comb section.

10. The cartridge picker, for a media cartridge autoloader that moves a media cartridge between two or more of a mail slot, a media drive and a cartridge storage section, the cartridge picker comprising:

a rotatable turntable that supports the media cartridge; and a cartridge transporter that transports the media cartridge between the turntable and one of the mail slot, the media drive or the cartridge storage section, the cartridge transporter including (i) a cartridge pin that engages the media cartridge to move the media cartridge relative to the turntable, (ii) a rotary arm that rotates to change the position of the cartridge pin between a reference position located outside the turntable and a home position located within the turntable, the rotary arm including a first-shaped section and a second-shaped section that has a different shape than the first-shaped section, and (iii) an arm, position detector that detects a rotational position of at least one of the sections to determine an arrival of the cartridge pin at the reference position;

wherein the cartridge pin is positioned at the home position by rotating the rotary arm in one direction until cartridge pin arrives at the reference position, and then rotating the rotary arm in the opposite direction through a predetermined angle;

wherein the cartridge transporter includes (i) a guide groove formed in the turntable, (ii) a rotary arm rotating mechanism that rotates the rotary arm, and (iii) a lever rotatably connected at a midpoint thereof to a tip end of the rotary arm, the lever including a guide pin at an end to engage the guide groove, and a cartridge pin at an opposite end to transport the media cartridge; and wherein the rotary arm is rotatably attached to the turntable to rotate about a point on an imaginary extension of the guide groove, and rotation of the rotary arm by the rotary arm rotating mechanism moves the guide pin in the guide groove, rotates the lever about the guide pin, and moves the cartridge pin in a direction orthogonal to the guide groove to transport the media cartridge.

11. A cartridge picker for a media cartridge autoloader that moves a media cartridge between two or more of a mail slot, a media drive and a cartridge storage section, the cartridge picker comprising:

a rotatable turntable that supports the media cartridge; and a cartridge transporter that transports the media cartridge between the turntable and one of the mail slot, the media drive and the cartridge storage section, the cartridge transporter including (i) a guide groove formed in the turntable, (ii) a rotary arm that is rotatably attached to the turntable so as to rotate about a point on an imaginary extended line of the guide groove, (iii) a rotary arm rotating mechanism that rotates the rotary arm, and (iv) a lever rotatably connected at a midpoint thereof to a tip end of the rotary arm, the lever including a guide pin to engage the linear groove, and a cartridge pin to transport the media cartridge;

wherein rotation of the rotary arm by the rotary arm rotating mechanism moves the guide pin in the guide groove, rotates the lever about the guide pin, and moves the cartridge pin in a direction orthogonal to the guide groove to transport the media cartridge relative to the turntable.

12. The cartridge picker for a media cartridge autoloader as claimed in claim 11, wherein the turntable includes a base plate, a floor plate fixed to an upper face of the base plate with a flat clearance therebetween, and an upper plate spaced apart from the floor plate with a clearance therebetween for receiving the media cartridge.

13. The cartridge picker as claimed in claim 12, wherein the rotary arm is arranged on the upper face of the base plate.

14. The cartridge picker as claimed in claim 12, wherein the rotary arm rotating mechanism is arranged on a lower face of the base plate.

15. The cartridge picker as claimed in claim 12, wherein the guide groove which the guide pin engages is formed in a lower face of the floor plate.

16. The cartridge picker as claimed in claim 12, wherein the lever is rotatably arranged in the fiat clearance between the base plate and the floor plate.

17. The cartridge picker as claimed in claim 12, wherein the cartridge pin includes an upper end projecting above a level of an upper face of the floor plate.

* * * * *